(12) United States Patent
Tripathi et al.

(10) Patent No.: US 7,664,938 B1
(45) Date of Patent: Feb. 16, 2010

(54) SEMANTIC PROCESSOR SYSTEMS AND METHODS

(75) Inventors: Devendra Tripathi, Union City, CA (US); Sarin Chandran, Milpitas, CA (US); Raman Muthukrishnan, San Jose, CA (US)

(73) Assignee: Xambala Corporation, San Jose, CA (US)

( * ) Notice: Subject to any disclaimer, the term of this patent is extended or adjusted under 35 U.S.C. 154(b) by 310 days.

(21) Appl. No.: 11/675,618

(22) Filed: Feb. 15, 2007

Related U.S. Application Data

(63) Continuation-in-part of application No. 11/375,385, filed on Mar. 13, 2006, and a continuation-in-part of application No. 10/753,846, filed on Jan. 7, 2004, now Pat. No. 7,548,848.

(60) Provisional application No. 60/774,044, filed on Feb. 15, 2006.

(51) Int. Cl.
G06F 9/44 (2006.01)

(52) U.S. Cl. .................................... 712/220; 712/29

(58) Field of Classification Search ............... None
See application file for complete search history.

(56) References Cited

U.S. PATENT DOCUMENTS

| | | | |
|---|---|---|---|
| 6,061,744 A * | 5/2000 | Mathur | 719/330 |
| 6,334,153 B2 * | 12/2001 | Boucher et al. | 709/230 |
| 2005/0138622 A1 * | 6/2005 | McAlpine et al. | 718/100 |
| 2005/0273792 A1 * | 12/2005 | Inohara et al. | 719/330 |
| 2007/0025351 A1 | 2/2007 | Cohen | |

* cited by examiner

*Primary Examiner*—Eric Coleman
(74) *Attorney, Agent, or Firm*—Martine Penilla & Gencarella, LLP

(57) ABSTRACT

A system including a CPU including logic for executing code from a location and at a time determined by an external entity, a data cache and a CPU management entity (CME) including logic for receiving data one unit at a time from an external data feeder. The data unit being arbitrarily defined mutually between the data feeder and the CME. The CME being coupled to the CPU. The CME including logic to provide the received data unit, a corresponding context information and a corresponding code address to the CPU, wherein the CPU includes logic for notifying the CME of a completed execution.

28 Claims, 9 Drawing Sheets

SEMANTIC PROCESSOR SYSTEMS AND METHODS

CROSS REFERENCE TO RELATED APPLICATIONS

This application claims priority from U.S. Provisional Patent Application No. 60/774,044, filed on Feb. 15, 2006 and entitled "SEMANTIC PROCESSING HARDWARE AND SOFTWARE TECHNOLOGY," which is incorporated herein by reference in its entirety for all purposes. This application is also a continuation in part of and claims priority to U.S. patent application Ser. No. 10/753,846, filed on Jan. 7, 2004 now U.S. Pat. No. 7,548,848 and entitled "METHOD AND APPARATUS FOR SEMANTIC PROCESSING ENGINE," which is incorporated herein by reference in its entirety for all purposes. This application is also a continuation in part of and claims priority to U.S. patent application Ser. No. 11/375,385, filed on Mar. 13, 2006 and entitled "METHOD AND SYSTEM FOR MANAGING DATA FLOW IN A PARALLEL PROCESSING SYSTEM," which is incorporated herein by reference in its entirety for all purposes.

BACKGROUND

The present invention relates generally to embedded processing systems, and more particularly, to data driven semantic processor systems and methods of operating such semantic processors.

Conducting everyday communication and transactions through the Internet has become routine for millions of people all over the world. This has tremendously increased the volume of the data that are being transferred and processed by routers, application servers. In addition, a significant portion of the Internet traffic carries or accesses sensitive data. Carrying and accessing sensitive data adds additional burdens of managing integrity and authentication check to be performed by application severs or by some intermediate devices (e.g., application delivery devices). In addition, much of such Internet traffic happens between different machines which run different applications. As a result the application delivery device may have to transform the message so that a target application can understand the message. Traditionally, such transformation has been performed by middleware software. Adding the additional burden of the integrity check, authentication and message transformation, on an application server overloads the server and in many cases makes it impractical because the overall throughput suffers.

As a result, an acceleration device which can implement these middleware functions at the rate of the incoming data would increase the throughput.

SUMMARY

Broadly speaking, the present invention fills these needs by providing a central processing unit subsystem (CSS) for a semantic engine. It should be appreciated that the present invention can be implemented in numerous ways, including as a process, an apparatus, a system, computer readable media, or a device. Several inventive embodiments of the present invention are described below.

One embodiment provides a system including a CPU including logic for executing code from a location and at a time determined by an external entity, a data cache and a CPU management entity (CME) including logic for receiving data one unit at a time from an external data feeder. The data unit being arbitrarily defined mutually between the data feeder and the CME. The CME being coupled to the CPU. The CME including logic to provide the received data unit, a corresponding context information and a corresponding code address to the CPU, wherein the CPU includes logic for notifying the CME of a completed execution.

The CPU can be an embedded CPU. The CME can be hardware logic. The CME can include a local buffer agent coupled to an external memory system, wherein the local buffer agent includes logic for allocating and de-allocating memory buffer pointers. The CME can include an enhanced memory access (EMA) coupled to the external memory system and wherein the system includes logic for saving and storing data structures as objects.

The CME can also include multiple command, control and condition registers. Each bit of the bits in the command register can define a trigger for a corresponding hardware or software function. Each bit of the bits in the command register can be self clearing. One or more bits of the bits in the control register can define a mode of a software or a hardware function. The one or more bits of the bits in the control register can not be self clearing. One or more bits of the bits in the condition register can define a completion or an error status of a software or a hardware function. At least one of the command, control and condition registers, includes a flag to indicate to a thread controller to schedule another thread.

The CPU can includes a level 1 instruction cache and wherein the CME can include logic for determining if a starting instruction is available in the level 1 instruction cache before the CPU executes code associated with the received data. Wherein if the starting instruction is not available in the level 1 instruction cache, then the system includes logic for pre-fetching the starting instruction from an external instruction memory into the level 1 instruction cache. The size of the pre-fetch is configurable.

The CPU can include a level 1 instruction cache and a level 2 instruction cache, the level 1 instruction cache can be logically closer to the CPU and the CME can include logic for determining if a starting instruction is available in the level 1 instruction cache and if the starting instruction is not available in the level 1 instruction cache, then including logic for determining if the starting instruction is available in the level 2 instruction cache and if the starting instruction is available in the level 2 instruction cache then including logic for pre-fetching the starting instruction from the level 2 instruction cache into the level 1 instruction cache and if the starting instruction is not available in the level 2 instruction cache then including logic for pre-fetching the starting instruction from an external instruction memory into the level 1 instruction cache. The CME can be coupled to a memory system for storing and retrieving context information.

Another embodiment provides a system including a standard off the shelf CPU (the CPU) having capability to execute code from a location and at a time decided by an external entity; it also has a data cache and CPU management entity (CME) being able to receive data one unit at time from an external data feeder entity, the unit being arbitrarily defined mutually between data feeder and CME, and CME being suitably connected to the CPU such that the CME receives the data from data feeder. The CME provides the data, associated context information and associated code address to CPU. The CPU executes the code and at the end of execution of code, CPU notifies back to CME. The CPU can be an embedded CPU. The CME can be hardware logic. The CME can also include a Local Buffer Agent (LBA) having connectivity to an external (of CME) memory system such that a software application running on the CPU allocates and de-allocates memory buffer pointers in same way as it reads and writes certain memory or register locations. The CME also includes an Enhanced Memory Access (EMA) having connectivity to external (of CME) memory system such that the software running on the CPU is able to save and store data structures as objects without having to execute any software managing the memory.

The System can also include a set of three registers: command, control and condition wherein each bit of command register defines trigger some hardware or software function external to system and the bit clears by itself and one or more bits of control register define the mode of software or hardware function external to system and the bits do not clear by themselves and one or more bits of condition register define the completion or error status of external software or hardware function external to system, such that the software running on the CPU is able to use the same three registers for the purpose of configuring, triggering and getting the completion status with one or more software or hardware functions external to system. The software using the same three registers, communicates to CME that a thread controller can allow the CPU to execute another thread while the external (to CSS) software or hardware function executes and thread controller schedules the thread back upon completion of the function.

The CPU can also include level 1 instruction cache and CME, before allowing the CPU to execute code associated with input data, also checks for availability of starting instruction of the code in level 1 instruction cache and if not it pre-fetches the instructions from external instruction memory into level 1 instruction cache of CPU, the size of pre-fetch being a configurable one or it being exact code size extended to nearest cache line boundary.

The CPU can include level 1 instruction cache and level 2 instruction cache, level 1 being logically closer to the CPU and CME before letting CPU execute code associated with input data, also checks for availability of starting instruction of the code in level 1 instruction cache and if not it pre-fetches the instructions from level 2 instruction cache (if code is available in level 2 instruction cache) or external memory (if code is not available in level 2 instruction cache) to level 1 instruction cache, the size of pre-fetch being a configurable one or it being exact code size extended to nearest cache line boundary.

The CME is coupled to memory space (external to system) for storing and retrieving context information and where it keeps the context information for certain data streams (called active streams) in data cache of CPU so that when unit of data arrives, CME can trigger CPU (assuming the CPU is done with process of previous data) without incurring any loss of time, otherwise required to fetch the data from memory space to data cache of CPU.

Another embodiment provides a system for processing data flows along a data path, including a messaging block for receiving a data flow, the messaging block establishing a context identifier for the received data flow, a scheduler for receiving the data flow and the corresponding context identifier from the messaging block and a processing engine being positioned along the data path and configured to process the data flow. The processing engine including a lexer module, a parser module and a filter module arranged to process the data flow serially, wherein each one of the lexer module, the parser module and the filter module include at least one semantic engine, The semantic engine including a cache memory, a thread controller logic and a common control interface including a command register, a control register and a condition register. The at least one semantic engine can include a save and restore logic. The at least one semantic engine can include a central processing unit subsystem, a CME logic, a debug interface including a JTAG type interface. The debug interface being coupled to multiple registers included in the semantic engine and a ring interface. The ring interface and the debug interface are coupled to the central processing unit subsystem through a first multiplexer and wherein the ring interface and the debug interface are coupled to the DMP logic through a second multiplexer. The at least one semantic engine can include a central processing unit subsystem, a DMA engine and a local buffer agent including logic for maintaining a list of buffer pointers available for use by the DMA engine, the list of buffer pointers being a first in first out list.

Another embodiment provides a system for processing data flows along a data path, including a messaging block for receiving a data flow, the messaging block establishing a context identifier for the received data flow, a scheduler for receiving the data flow and the corresponding context identifier from the messaging block and a processing engine being positioned along the data path and configured to process the data flow. The processing engine can include a lexer module, a parser module and a filter module arranged to process the data flow serially, wherein each one of the lexer module, the parser module and the filter module include at least one semantic engine. The semantic engine can include a central processing unit subsystem, a CME logic, a debug interface including a JTAG type interface, the debug interface being coupled to each of a plurality of registers included in the semantic engine and a ring interface, wherein the ring interface and the debug interface are coupled to the central processing unit subsystem through a first multiplexer and wherein the ring interface and the debug interface are coupled to the DMP logic through a second multiplexer.

Another embodiment provides a system for processing data flows along a data path including a messaging block for receiving a data flow, the messaging block establishing a context identifier for the received data flow a scheduler for receiving the data flow and the corresponding context identifier from the messaging block and a processing engine being positioned along the data path and configured to process the data flow. The processing engine can include a lexer module, a parser module and a filter module arranged to process the data flow serially. Each one of the lexer module, the parser module and the filter module include at least one semantic engine. The semantic engine can include a central processing unit subsystem, a DMA engine and a local buffer agent including logic for maintaining a list of buffer pointers available for use by the DMA engine, the list of buffer pointers being a first in first out list. The local buffer agent can include more than one type of buffer pointer. The local buffer agent can include a selected maximum number of buffer pointers for each one of the buffer types. The local buffer agent can include a first port, a second port and logic for fetching and de-allocating a buffer pointer through the first port and logic for allocating a pre-fetched buffer pointer and collecting a de-allocated buffer pointer through the second port.

Another embodiment provides a system for processing data flows along a data path including a messaging block for receiving a data flow, the messaging block establishing a context identifier for the received data flow, a scheduler for receiving the data flow and the corresponding context identifier from the messaging block and a processing engine being positioned along the data path and configured to process the data flow. The processing engine can include a lexer module, a parser module and a filter module arranged to process the data flow serially, wherein each one of the lexer module, the parser module. The filter module can include at least one semantic engine including a central processing unit subsystem, a level 1 cache, a level 2 cache, a level 2 cache arbiter coupled to the level 2 cache and a prefetch logic coupled between the level 1 and the level 2 cache and the level 2 cache arbiter. The prefetch logic including a prefetch buffer, logic for pre-fetching a first cache line, logic for storing the prefetched first line the prefetch buffer as a first contents of the prefetch buffer, logic for transferring the first contents of the prefetch buffer to the central processing unit subsystem for execution and logic for fetching the next cache line while the first contents of the prefetch buffer is executed by the central processing unit subsystem. The prefetch logic can include logic to determine if a level 1 miss occurs and logic to determine if the missed line is present in any prefetch buffers of any of the at least one semantic engines. The prefetch logic can include logic for feeding the missed line from the respective one of the prefetch buffers, if the missed line is present in any prefetch buffers of any of the at least one semantic engines. The prefetch logic can include logic for fetching the missed line and a next cache line and logic for storing the next cache line in a next cache line buffer in the prefetch logic and logic for passing the missed line to the L1 cache.

Another embodiment provides a method of executing code in an embedded CPU including accessing executable code from a storage location and at a time determined by an CPU management entity, wherein the CPU management entity is external from the CPU and wherein the CPU includes a data cache, determining a data unit size in the data feeder and the CME, the CME being coupled to the CPU, receiving data from the storage location, the data being received one unit at a time, wherein receiving the data unit includes providing a corresponding context information and a corresponding code address to the CPU, executing the received data unit in the CPU, notifying the CME that the received data unit execution is completed.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Figure 1:
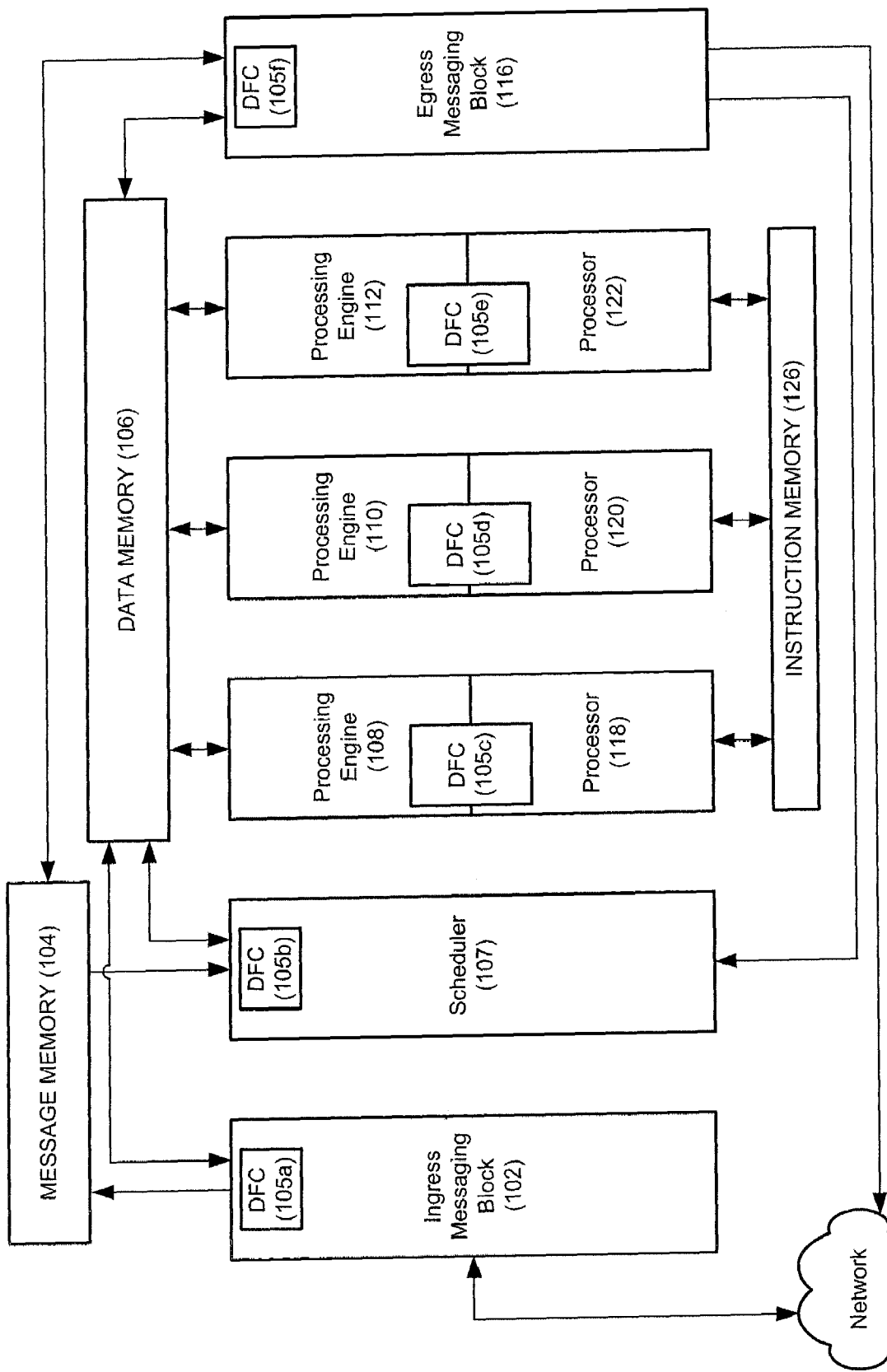
FIG. 1 is a high-level functional block diagram of the system that performs parallel processing of the data flow, in accordance with an embodiment of the present invention.

Several exemplary embodiments for a central processing unit subsystem (CSS) for a semantic engine will now be described. It will be apparent to those skilled in the art that the present invention may be practiced without some or all of the specific details set forth herein.

As described above an acceleration device which can implement some or all of the middleware functions at the rate of the incoming data would increase the overall data throughput. One embodiment of the acceleration device includes a CPU subsystem where the operating system type needs of an application can be met by a separate entity (e.g., hardware logic) such that operating system (real time or otherwise) is not needed to run the CPU subsystem.

A semantic processor, which understand the semantics of an input message using grammar and then execute actions like routing, filtering or transformations is one such acceleration device. Semantic processors are multi-stage pipelined data driven devices. The semantic processor can include multiple embedded processors. By way of example, one or more embedded processors can be included at each processing stage. The multiple embedded processors can be compared to a fully automated shop floor for a manufacturing facility. In an automated manufacturing facility, raw material comes in and after several intermediate transformations, finished good are output. Each intermediate transformation occurs at various intermediate processing locations within the automated manufacturing facility. Each intermediate transformation being triggered by the arrival of the required input materials. In a semantic processor, a raw message is input and after being processed by several intermediate processing stages (each intermediate processing stage being triggered by arrival of the required input data) the final transformed and/or filtered content is output.

There are two main reasons why embedded processors become a must in various semantic processing stages. First, semantics is a function of language and one can neither take languages for frozen nor economically build hardware for handling all language nuances. Secondly, what to do with the semantics, is even more changeable based on application, and therefore a processor is the most efficient system to process the semantics.

Due to the throughput demand, these embedded processors cannot afford the delays required to run traditional software based operating systems, real time or otherwise. However, the software applications running on the embedded processors still need many of the facilities provided by a typical operating system. The facilities which embedded applications need in semantic processor, which are typically provided by an operating system in a typical CPU environment include multiple thread support and the corresponding scheduling. Multiple thread support is needed because embedded processor may be required to process multiple data streams. Another typical operating system facility needed by an embedded processor includes an efficient memory management system and an efficient hardware access support and facilities like semaphore. The efficient hardware access support is similar to the functions drivers provide in a typical operating system/CPU environment.

FIG. 1 is a high-level functional block diagram of the system that performs parallel processing of the data for a flow, in accordance with an embodiment of the present invention. FIG. 1 includes an ingress messaging block 102, message memory 104, data memory 106, processing engines 108-112, egress messaging block 116, and instruction memory 126. Ingress messaging block 102 is capable of receiving whole or part of a data flow. The data flow is then stored in message memory 104. A copy of the data flow is passed on to the processing engine 108. The processing engines 108-112 process the data in stages. The processed data from each stage is represented as a data structure called data token, which is then passed on to the next stage of the processing pipe. Processing engines 108-112 are dedicated hardware blocks, which work on predefined structures and related operations. The processors 118-122 associated with processing engines 108-112 work on user defined structures and related operations. Processing engines 108-112 work in conjunction with processors to process the data coming in for a data flow. Processors 118-112, fetch the instructions for execution from instruction memory 126. The processed data are passed on from processing engine 108 through processing engine 112. Each of the processing engines 108-112 and their associated processors 118-122 process the data flow. As part of processing, the engines create semantic data structures that are stored in memory 106, with the data tokens capturing the signatures of the various data structures. Once processed, the message data in message memory 104 and the semantic data structures stored in data memory 106 are sent out through egress messaging block 116 to the destination (not shown).

When parts of several data flows arrive at messaging block 106, after processing part of one flow the processing engines 108-112 have to switch and process the data of another flow and then again switch back to the previous flow when the rest of the previous flow arrives. Each time a switch happens, the processing engines have to save in data memory 106 the flow context information of the current flow and read the flow context information of the new flow to which the switch is occurring. The flow context information has information like state at which the processing was stopped, address where the partial semantic data structures for the flow have been stored in data memory 106, etc. When the current flow returns for processing, the flow context information helps the processing engines 108-112 to continue the processing from the position processing engines 108-112 had stopped previously. Thus, each switch requires saving of flow context information in memory 106 for the current flow, and retrieving the flow context information for the new flow. The cycle time for each switch can add up to a significant delay as the processing engines are occupied with the saving and retrieving operation. To solve this, the switch is managed through distributed flow context (DFC) 105a, 105b, 105c, 105d, 105e, and 105f. The functions of DFC will be explained in detail below.

Figure 2A:
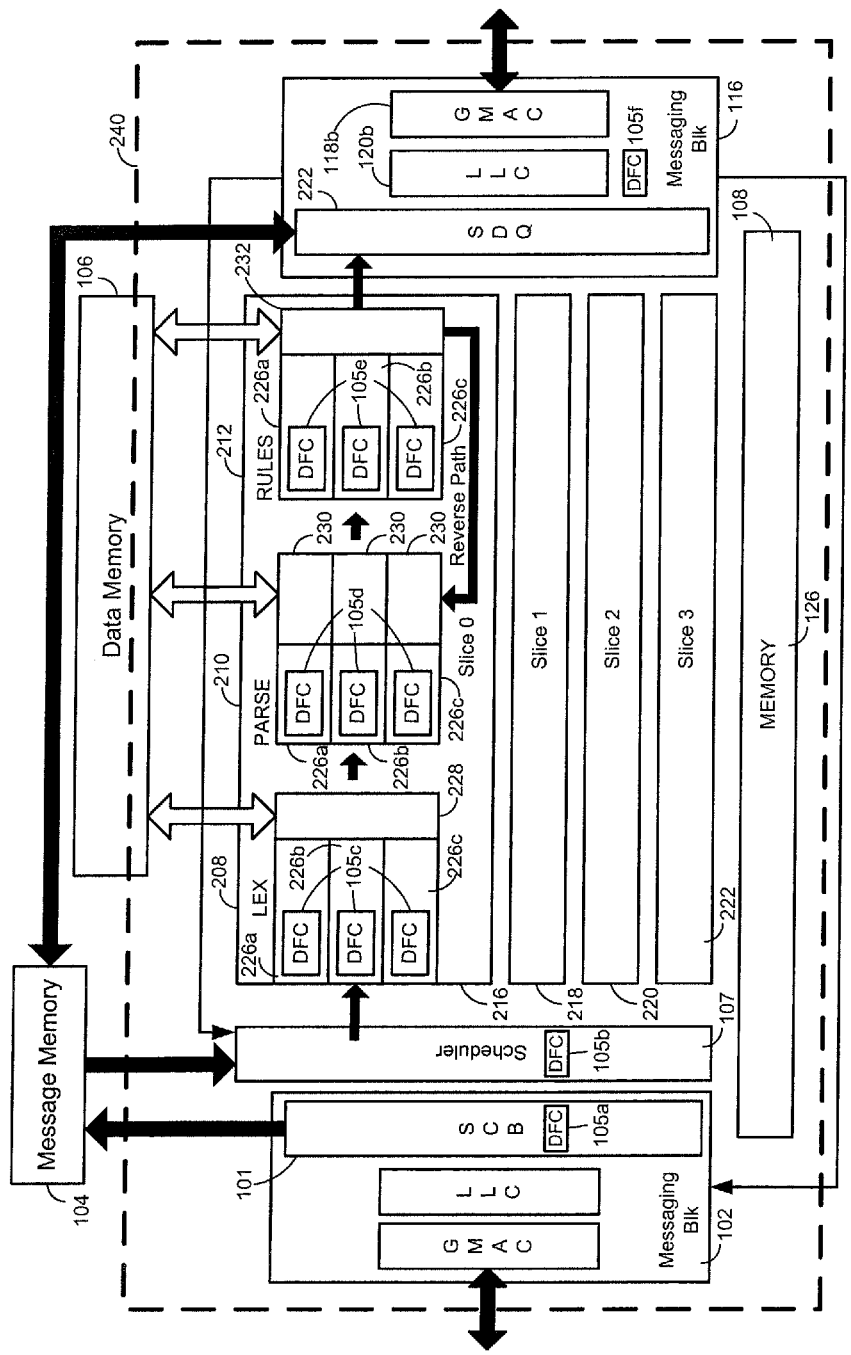
FIG. 2A shows an exemplary high-level block diagram of a system that efficiently performs parallel processing of the data flow, in accordance with an embodiment of the present invention.

FIG. 2A shows an exemplary high-level block diagram of a system that efficiently performs parallel message processing, in accordance with an embodiment of the present invention. In this exemplary model, the content of the message is being processed according to grammar rules. FIG. 2A shows a chip 240, which includes messaging blocks 102 and 116, message memory 104, data memory 106 and instruction memory 126. The system is capable of processing multiple flows in parallel. The system as shown includes four slices 216, 218, 220, and 222. One skilled in the art should understand that the number of slices is arbitrary and the system may include more or less than 4 slices. Within each of the slices 216, 218, 220, and 222, the messages are processed by lexer 208, parser 210, and filter 212. One skilled in the art should understand that the message may be processed in other ways than the example illustrated here. Any type of data processing can be accomplished through this system.

Each slice further includes three channels 226a-226c. Each channel is shown to maintain context information of a number of flows internally on the on-chip memory (not shown) in order to provide fast switching among the flows. It should be understood that the number of slices and the number of channels shown are arbitrary and can vary according to the desired functionality. The details of the use of contexts will be described in detail below. Lexer 208 and filter 212 are shown to share one processor 228 and 232 among the channels 226a-226c within each slice, while each of the channels 226a-226c of the parser is shown to have its own processor 230. One skilled in the art should understand that the number of processors within each slice may be adjusted according to the function to be performed by the system. The context switching during message processing will be described in detail below. Scheduler 107 has the responsibility of assigning flows to the contexts of every channel according to set policies, and sending of DFC messages to the channels. The DFC messages include switch-flow, cache, and uncache. The function of these messages are described below.

A message arrives at ingress messaging block 102. The messaging blocks 102 (ingress) and 116 (egress) are shown to include GMAC 118a and 118b, LLC 120a and 120b, and SCB 101 and SDQ 222, respectively. Every hardware and software within the system works based on a context. The management of the contexts is distributed hierarchically throughout the system and the DFC within each unit of the system performs a part of the context management. For example, DFC 105a within SCB 101, which is at the first level of hierarchy, manages the context data for a data flow between the fast and slow memory (not shown) within data memory 106, details of which will be described below. DFC 105b within scheduler 107, which is at the second level of hierarchy, manages the context data within each channel by generating messages to cache the context data of the data flow that is active, and uncache the flow context information of the data flow that is inactive. During uncaching, the flow context information is transferred from the on-chip memory (not shown) on chip 240 to data memory 106, details of which will be described below. DFC 105b also manages the switch of context data used by the processing engine between on chip memory and context registers (not shown) on the chip. This switch, which is at the third level of DFC processing hierarchy is performed between context data for the active flow and context data for next flow in the processing pipeline of the processing engine.

The cache, uncache, and flow switch messages are handled by a hardware entity local to each of the processing engines. The three levels of DFC processing hierarchy are provided to cater to different frequency of access to context data by various stages of the processing pipeline. The first level, which is the aging process managed by the DFC 105a within SCB 101, is determined by the rate at which message segments are arriving at the input of the processing pipeline. This allows the most cost effective use of hardware resources at maximum efficiency. The second level, which is the cache/uncache process managed by the DFC 105b within scheduler 107, is determined by how the hardware channels can be efficiently used by the scheduler. The granularity at which the scheduler needs to operate is higher than the rate at which session manager operates. The third level, which is the flow switch though managed by scheduler 107, is executed by the hardware (not shown) local to each of the processing engines (108-112). The processing engines (108-112) need to operate on several bits of context data in the same cycle, which is not possible if the context data were to be accessed from external memory or the on chip memory.

The message that arrives at the messaging block 102 is forwarded to lexer 202 for further processing. In one embodiment, the lexer 202 generates substrings of the message and assigns token identification (token ID) to each of the substrings. The message is then passed on to parser 230. The parser 230 builds a parse tree based on the grammar rules identified in the messaging block 102. Filter 212 applies rules to the message and the message is forwarded to messaging block 116. The rules may vary. For example, in one embodiment the rule may indicate the message to be spam and direct the message to be discarded. In another embodiment, the message may be an invoice and the various pieces of information from the invoice may be forwarded to different entities. Yet in another embodiment, the message may be indicated to be the price of the stock of a particular corporation, etc.

There are several terms and acronyms used to describe the various embodiments of the invention including the following terms.

Parsed data dequeue (PDQ) is one of the modules that handles semantic data export activity.

PCI-DMA module scatters semantic data into closely coupled host system (i.e., similar to a DMA module on a PCI-X bus).

Queue memory manager (QMR) is a message memory subsystem including enqueuing, non-destructive dequeuing, and destructive dequeuing.

Memory subsystem (MSS) stores intermediate and final semantic data.

The lexing module (lexer) 208 is a token generator part of semantic processing system.

The parser or production generator 210 is another part of semantic processing system.

Indexing and filtering (IFE) 212 is a final stage of the semantic processing sub system.

A free list manager (FLM) is a hardware component which maintains a list of pointers to buffers of fixed size which have not been allocated to any other process. The FLM's functionality is to allocate free buffer pointers if available or indicate the unavailability of free buffer pointers, on request by a process. FLM also has the function of collecting the free buffer pointers returned by a process after use.

A flow is a delineated data processing session. The flow is delineated by an explicit or an implicit control message sequence. The flow is associated with a specific context of data, which defines the data flowing through the semantic engine.

A chunk refers to 32-byte area in memory. Generally, the SE 228, 230, 232 uses the memory systems in 32-byte areas or chunks.

De-allocating refers to releasing a buffer pointer to the FLM.

Enqueue means to write data in to unified memory.

Dequeue means to read data from unified memory.

Figure 2B:
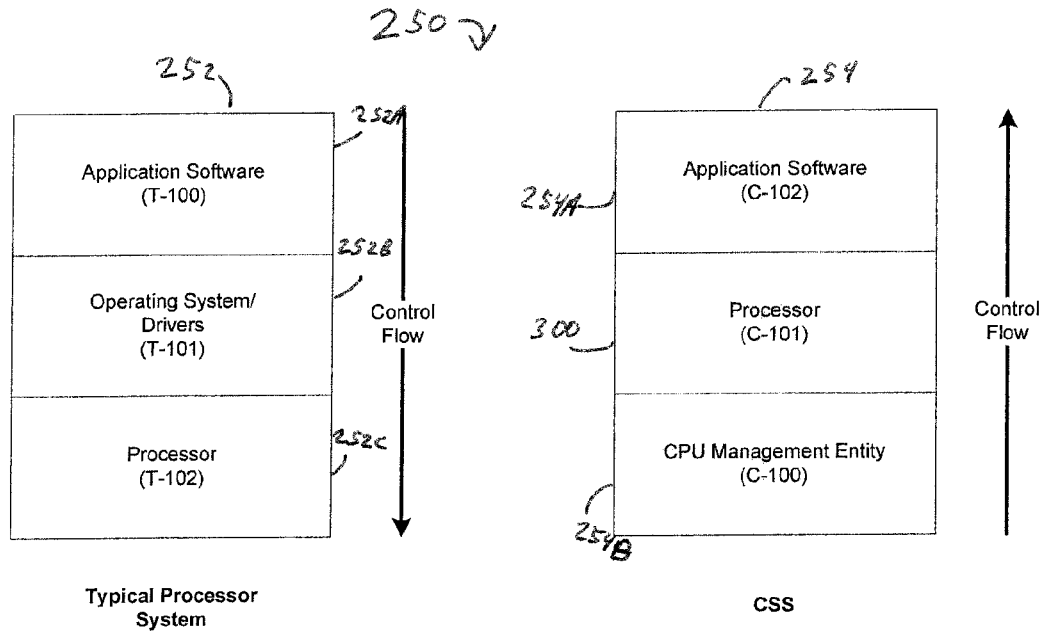
FIG. 2B is an overview of a comparison of data processing, in accordance with an embodiment of the present invention.

FIG. 2B is an overview of a comparison 250 of data processing, in accordance with an embodiment of the present invention. The data driven architecture of a CSS 300 is different from a typical processor system. The control flow in a typical processor system (e.g., a T-100 processor system) 252 starts from the application 252A, where the application first registers itself with the operating system 252B. Depending on the operating system 252B scheduling policies the application 252A is allowed to run as a single/multiple threaded (depending on the application) process on the processor 252C. Also any low level hardware accesses to be performed by the application 252A are routed through the device drivers included in the operating system 252B and corresponding to the device to ensure that the application does not violate any of the hardware access protocols.

The control flow 254 in a data driven embedded processor CSS 300 is such that an application 254A comes into context to execute the instructions without any software process having to execute, to put the application in context. In the data driven architecture, arrival of logical data elements is indicated to a hardware entity called CPU management entity (CME) 254C. The functionality of the CME 254C is to prepare the context for the CSS 300, to start execution of an application corresponding to the logical data element. The preparation of context happens in the background while the CSS 300 is an earlier context executing a different application. As soon as the previous application has completed or is stalled waiting for some hardware operation to complete, CME 254C switches the context of the CSS 300 to execute the application 254A corresponding to the new logical data element. CME 254B also provides all the low level services that would have been typically provided by operating system (e.g., memory management, standard interface to hardware devices, DMA, semaphores, etc). The CME 254B also handles prefetching of instruction for the application 254A coming into context if the level 1 cache of the processor encounters a cache miss.

Figure 2D:
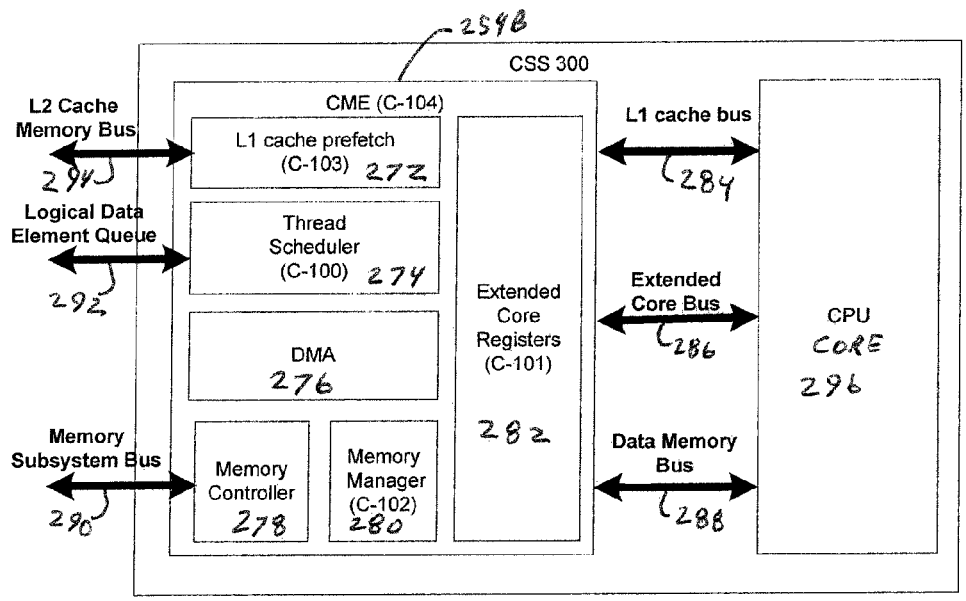
FIG. 2D is a logical block diagram of the CSS, in accordance with an embodiment of the present invention.
Figure 2C:
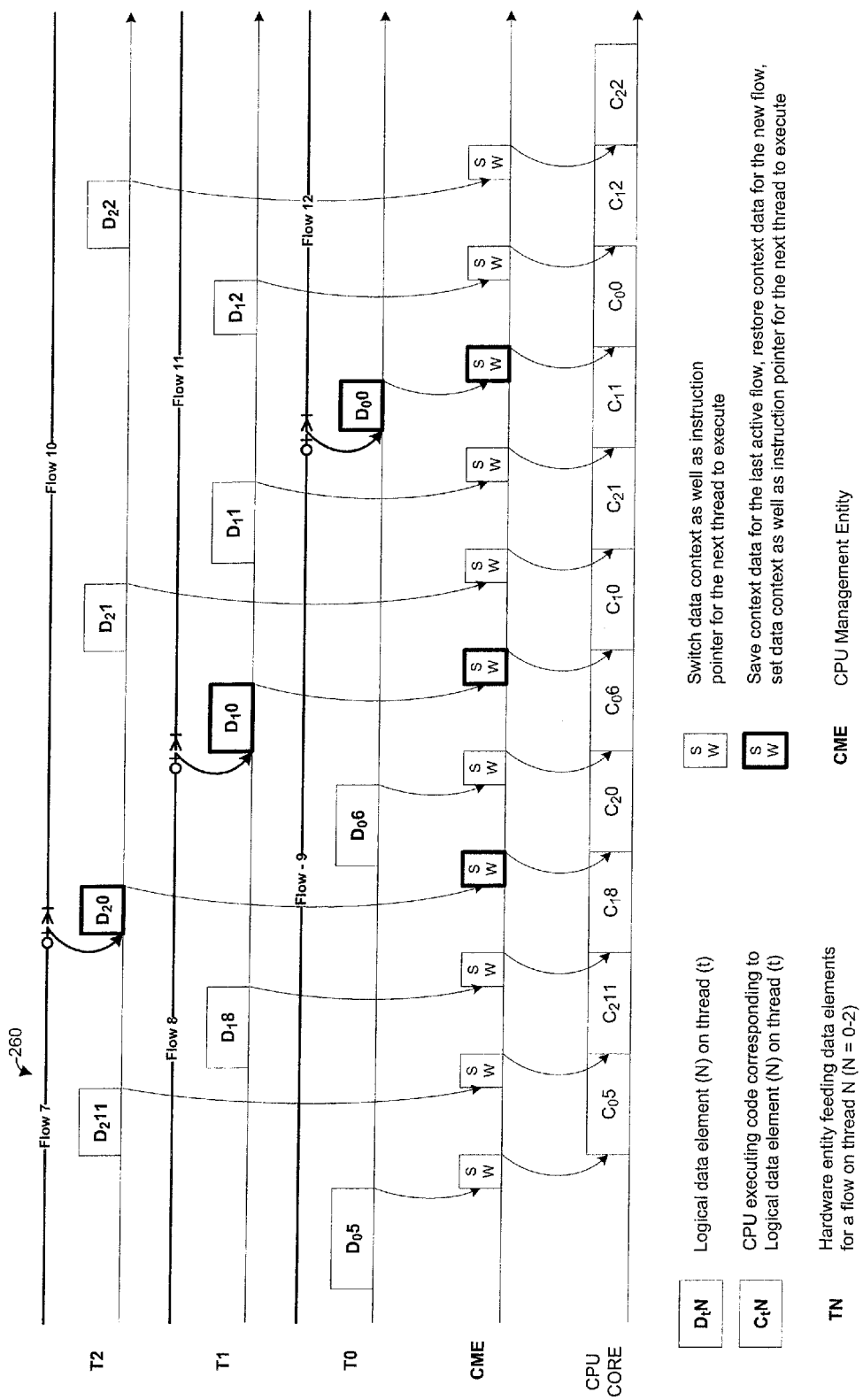
FIG. 2C is a timing diagram of multiple threads, in accordance with an embodiment of the present invention.

FIG. 2C is a timing diagram 260 of multiple threads, in accordance with an embodiment of the present invention. The timing diagram 260 illustrates the role of the CME 254B in scheduling different threads T0, T1, T2, to the CSS 300, based on the logical data elements which keeping arriving at CME. Data is scheduled for semantic processing as flows. Each flow has a corresponding byte stream of data to be processed. The logical data elements are the outputs generated by processing engines 208-212 of FIG. 2A. Each of the processing engines 208-212 is associated with one of the threads T0, T1, T2 of the CME 254B. As logical data elements arrive, the CME 254B prepares the context for the logical data, and switches context to the new thread if the current thread is idling (e.g., waiting for some hardware access to complete) or has completed processing. This ensures that the processor bandwidth is completely utilized for executing useful instructions required for processing the logical data element of different threads and thereby increases the data throughput of the processor.

FIG. 2D is a logical block diagram of the CSS 300, in accordance with an embodiment of the present invention. The CSS 300 includes the CME 254B and the CPU buses 284-292 that couple the CME to the CPU core 296. The overall hardware framework of semantic processing uses the CSS 300, including a pure hardware state machine, to be used as the core processing element. However there are challenges, first, how to provide access to powerful hardware functions (e.g., regular expression lookup, Xpath processor, hash lookup etc.) in blocking as well as non blocking way and second, how to provide maximum throughput of these processing elements within the limitations of hardware implementations. Specific systems and methods are implemented to address these challenges.

The CSS 300 can be used in multiple locations within a specific implementation of a full semantic processing system. The CSS 300 includes a substantially uniform (across all similar elements) system and method of "command, control and condition" for connecting the core processing elements to any one or more external control, logic and arithmetic functions. A system and method allowing the processing element to process external events in a parallel "case" manner rather than requiring a sequential "if-else" manner is also included. The CSS 300 also includes parallel DMAs capable of accessing a segmented memory system.

The CSS 300 includes a system and method of prefetching of instructions for potential use. For example an instruction can be prefetched by snooping the task feeder to hardware task scheduler bus. CSS 300 also includes a hierarchical instruction cache system to increase the system efficiency For example, a prefetch block kills an instruction fetch request in case the request has not been honored by a Level 2 cache yet and next miss request from Level 1 cache has already arrived. A prefetch block increases the priority of a current pending prefetch request to Level 2 cache and instruction memory if a miss request has been received from Level 1 cache for a cache line same or different than the line being prefetched.

The hardware can be closely integrated using the command, control and condition interface. By way of example a local buffer agent (LBA) is a powerful hardware that can make otherwise complex memory management a single clock operation. An ASCII to Integer/float converter that can convert strings to integer values. A normalizer can include various kinds of uniform resource locator (URL) normalizer functions.

In networking applications in general and semantic processing in particular, the data cache does not work as well as it could. Ever faster cache memory is helpful however, an improved memory map that can provide faster cache memory access also improves the performance of the cache memory. One embodiment of the present invention is an improved memory map that provides faster cache memory access. By way of example, the improved memory map can access the cache memory in as little as one memory clock cycle. The improved memory map is more feasible to implement in silicon.

There are four levels of hierarchy for data memory. The first level is immediate memory that is accessible in a single clock cycle. Load/Store accesses to this memory does not result in a processor pipeline stall, since these memories are the processor data bus. The second level is high frequency access memory that is accessible in approximately three clock cycles or less. Load/Store accesses to this memory result in a processor pipeline stall, since these memories attached to the queue interface of the processor data bus. These memories are typically shared by the processing engines & the processor, and accesses to it are granted only after arbitration. The third level is on-chip data memory pool that is accessible in approximately six clock cycles or less. Load/Store accesses to this memory also result in a processor pipeline stall, as the data path to these memories are again provided through the queue interface of processor data bus. These are on-chip memories but are shared by processing engines & processors across all the slices. The arbitration delay is longer as a result due to the number of requesters. The fourth level includes other memories including the SRAM/DRAM type memories. The fourth level memories have and access time of between about twelve and about fifty clock cycles.

In one embodiment, the semantic processing uses specialized hardware components. By way of example, several relatively complex logic routines similar to logic that might typically be embodied in software are instead instantiated in hardware logic components. These hardware components include a common interface including parameters, command or "go" trigger, response data and condition or "done" indication.

One challenge is to provide this data and command/indication seamless to software applications. One approach has the parameters (e.g., input as well as output) implemented through registers. The registers are mapped into 1 clock access local memory. For example the Input Message Area (IMA) where the data tokens are presented to the processor to act upon. The command bits are implemented through self clearing core register. This makes not only clock trigger possible but also more than one command can be fired at the same time. One common case is combination of a "start" command and a "sleep" command. The hardware triggers and thread controller sets the thread to go to sleep, allowing the CSS to process another thread while some of the hardware modules are busy.

The condition bits can be mapped to core registers and optionally to condition ports. As a result, a 1 clock (e.g., for a $J_{conditionPort}$ ConditionProcessingRoutine) or a 2 clock (e.g., for an XOR CoreRegN, BitM; $J_{zeroFlag}$ ConditionProcessing Routine) condition check and jump is possible.

The CSS 300 includes two memory access/management hardware modules. The first is a local buffer agent module. Using a specific command and pointer as parameter de-allocation can be requested, in one clock. Similarly, checking valid "condition" of pointer can be read and used. The second is set of memory access primitives that are provides as feature of a DMA engine. One of the memory access primitives uses the local buffer agent hardware and allows software applications to request writing of N-bytes of data across one or more memory segments.

The CSS also includes a save and restore engine (SRE) for limited application data. The SRE can save and restore significant amount of application data (these could be partial data structures being currently operated upon by the processor, and could be as much as 512 bytes to 1024 bytes) to and from slower memory which are typically DRAM due to is longer access times. Also DRAM are chosen as context storage media as they are cheap and high density memories. Even though these are innovations related to memory subsystems, the improved CPU subsystem tightly integrates these innovations so as to make them seamless to software.

Instruction and data cache includes a predictive instruction prefetching system and method and a deterministic instruction prefetching system and method. The predictive instruction prefetching system and method provides that after a miss, a cache line is predicted for prefetching. The line could be the next one or could be another based on history. The history is generally two instances deep but could be deeper. The predictive instruction prefetching system and method also prioritizes a miss request and predictive prefetching such that a miss is given a higher priority. If a miss request is received before predictive prefetching has been serviced, the prefetching request is automatically dropped and is replaced by another predictive request due to the higher priority.

In semantic processing setup (as is the case with many networking applications), it is generally known before hand the task which embedded processor would execute. The deterministic cache prefetching system and method provides the future task pointer and, if there is a miss, requests prefetching. The cache controller provides another "side band" cache hit check for this. The size and segments of instructions to be prefetched in this case is also learned from history (e.g., starting with N cache line: N being 1 mostly). The reason for this is that after the task is entered, the presence or occurrence of certain conditions is determined and then the code jumps. Prefetching lot of linear code therefore may not significantly help.

The size and segment learning has cache like database itself. By way of example, it follows M way associatively (e.g., can be M=4) and K deep (e.g., can be K=4). The value of M indicates the number of branches, the code takes in the initial phase of execution plus 1 (this additional 1 represents the starting task pointer). The value of K is the number of distinct start pointers for various tasks.

Figure 3:
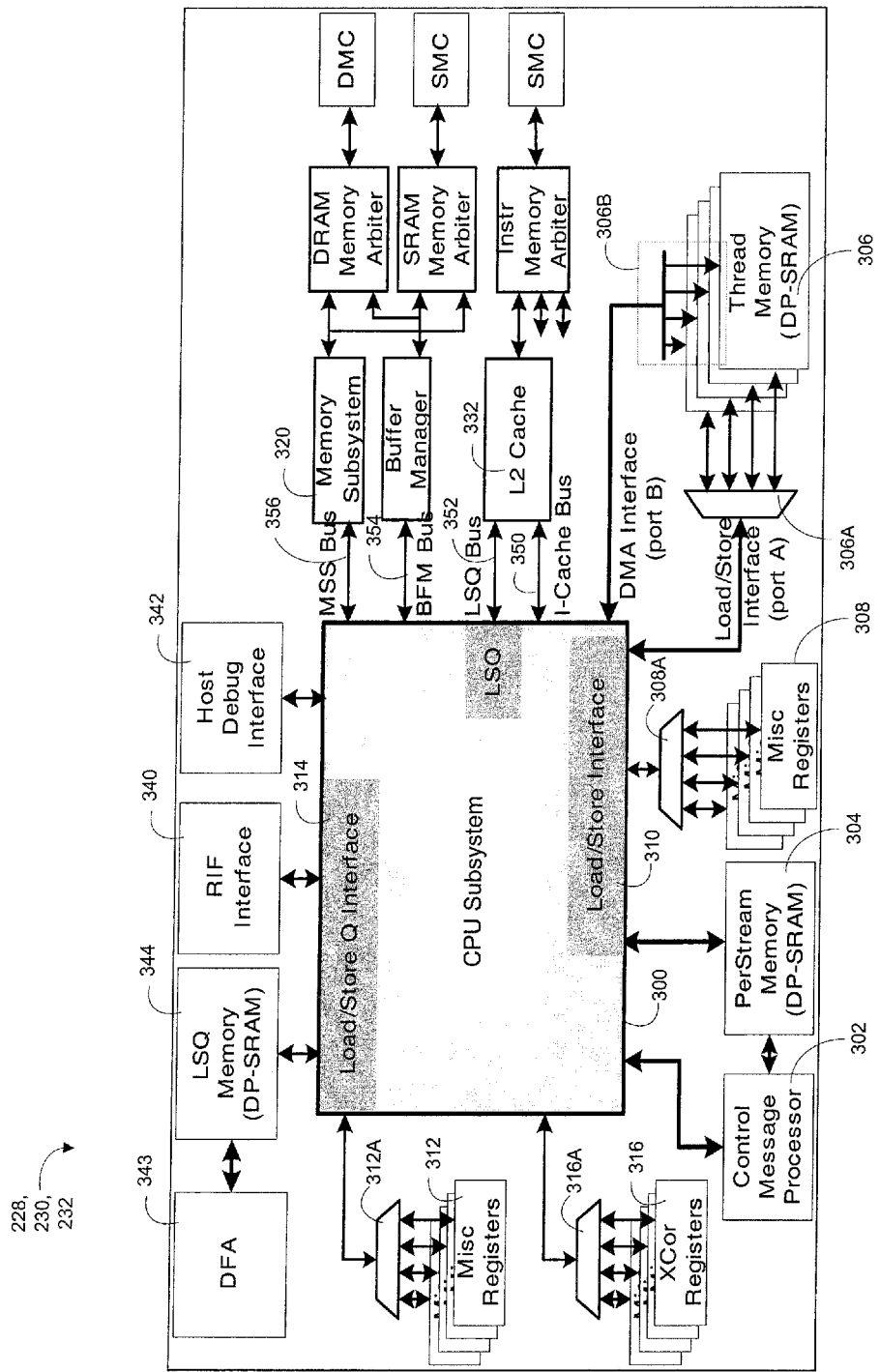
FIG. 3 is a functional block diagram of the semantic engine (SE), in accordance with an embodiment of the present invention.

FIG. 3 is a functional block diagram of the semantic engine (SE) 228, 230, 232, in accordance with an embodiment of the present invention. FIG. 3 shows the major functional modules interfacing with the CPU subsystem (CSS) 300. The control message processor 302 requests the thread controller for a processing thread, to hand off the processing following the hardware action. The CPU PerStream memory 304 brings in and saves out the CPU per stream structure to/from this memory when received a cache/un-cache token. The SRE in SE 228, 230, 232 updates and uses the contents in CPU PerStream memory after completing a save/restore operation as requested by the application software.

A CPU thread memory 306 is used by the CSS 228, 230, 232 to maintain application specific data. The CPU thread memory 306 includes a separate physical memory for each thread. The DMA engine in the CSS 300 also interfaces with the second port 306B of the CPU thread memory 306 to execute the read/write operations initiated by the application software. The second port 306B of the CPU thread memory 306 can also be shared with other hardware modules.

The miscellaneous registers 308 are coupled to the CSS 300. The miscellaneous registers 308 include 16 registers per thread. The CSS 300 accesses the miscellaneous registers 308 through a load/store interface 310. The miscellaneous registers 308 are coupled using the common hardware interface. A second set of miscellaneous registers 312, again 16 register per thread, can also be mapped on the load store queue interface 314. The two sets of miscellaneous registers 308, 312 sets are differentiated by the physical address issued by the CSS 300.

The extension core registers (XCor registers) 316 specific to each of the instances can also be coupled to the CSS 300. Each of the CPU thread memory 306, the miscellaneous registers 308, 312 and the XCor registers 316 are coupled to the CSS 300 through respective multiplexers (mux) 306A, 308A, 312A and 316A.

A memory subsystem 320 accepts read/write requests from the CSS 228, 230, 232 and couples the read/write requests to external SRAM, DRAM and internal on-chip SRAM. The load/store requests from the CSS 300 mostly are single read/write transactions, whereas the DMA read/write transfers are most performed in bursts.

A buffer manager 330 allocates free pointers based on the buffer type request. The buffer manager 330 also collects any de-allocated pointers to be returned back to the free list pool.

An L2 Cache 332 interfaces with the external instruction memory such as for instruction codes. All the instruction fetch requests from the CSS 300 as well as the load store requests are directed to this the L2 Cache 332.

A ring interface (RIF interface) 340 is used by the host/YCPU to access the hardware and CPU specific registers within the SE 228, 230, 232.

A host debug interface 342 can be used by an external debugger to access and debug the CSS 300. The host debug interface 342 can be JTAG interface.

A load/store queue memory 344 is used to access on chip memory shared with the interfacing hardware.

Figure 4:
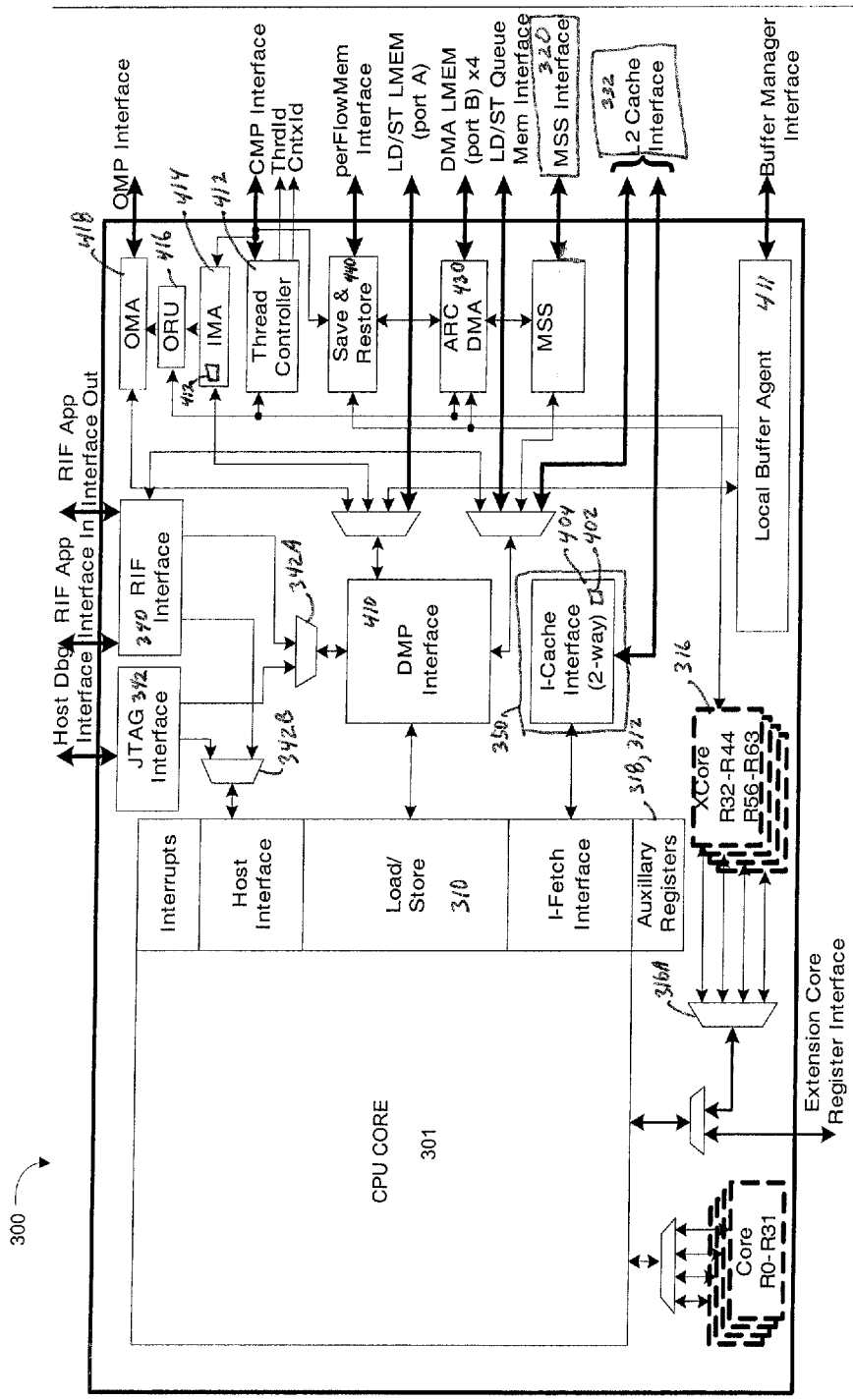
FIG. 4 is a more detailed functional block diagram of the SE, in accordance with an embodiment of the present invention.

FIG. 4 is a more detailed functional block diagram of the SE 228, 230, 232, in accordance with an embodiment of the present invention. The data flow through the various functions performed by the SE 228, 230, 232. When the CSS 300 fetches an instruction following an I-cache miss from the external instruction memory, the cache line size of the instruction fetch is 8 words. The cache data bus 350 has a width of 32-bits and a 24-bit instruction address. The MIB register 402 within the I-cache interface 404 is used to configure the instruction memory base address for the respective CPU. By way of example, the MIB register 402 maps the zero register for each of the respective CPUs, thereby allowing multiple CPUs to be addressed in the same manner.

The SE 228, 230, 232 stores/retrieves data from the external data memory based on the load/store requests from the CSS 300. The data is fetched through the DMP module 410, which interfaces with the memory subsystem 320. In one embodiment, the addresses above a selected address range (e.g., 256 KB) can be automatically directed to the memory subsystem 320.

An external debugger system can access the CSS 300 for debugging purposes through the host debug interface 342. The host debug interface 342 can include a JTAG-type test interface. The host debug interface 342 can access the CSS 300 and the remaining subsystems in the SE 228, 230, 232. The host debug interface 342 uses the DMP module 410, through multiplexer 342A to access the memory subsystem 320.

The CSS 300 can initiate DMA transfers from and to external data memory from any of the threads to and from the master thread memory. The region reserved for master thread memory can be any suitable size. By way of example, region reserved for master thread memory can be 8K bytes or smaller (e.g., 4K bytes) or larger (e.g., 16K or 32K bytes) as desired for the specific design and use of the SE 228, 230, 232. The region reserved for the master thread memory may be physical or virtual memory and combinations thereof. The region reserved for the master thread memory is also interfaced with the load/store interface 310 of the CSS 300.

The local buffer agent 411 is a logical part of the buffer manager 330. The local buffer agent 411 maintains a list (pool) of buffer pointers. Available (free) pointers in the buffer pool are presented to an application running on the CSS 300 using 2 registers located in a region of memory reserved for miscellaneous registers 308. The availability of free buffers in the pool is indicated to the CSS by a condition flag. Two flags are reserved for this purpose. An application running on the CSS 300 will check the condition flag before reading the free pointer. The DMA engine can also check the condition flag before reading the free pointer as part of consuming the free buffer pointers for executing the DMA write commands.

The local buffer agent 411 also provides up to 3 buffer pointers to the external interfacing hardware. The valid pointer on this interface is indicated using a flag bit. Asserting a ptrRd signal on each of the interfaces clears the valid bit and is enabled again when a new pointer has been loaded. The DMA engine can perform read, de-allocate and de-allocate all commands to free the buffers during the read operation.

An application running on the CSS 300 can write into a register to de-allocate a buffer pointer. This pointer is then added to a queue in the local buffer agent 411. When the number of pointers added to the queue for de-allocation exceeds a pre-selected number (e.g., 8, 10, 12, 16, 32, etc.) these buffers are scheduled for de-allocation.

The control message processor 302 schedules a request for thread switch when the interfacing hardware (e.g., 208, 210, 212) requests for CSS 300 action, following the processing done by the hardware. The thread controller 412 waits for the current thread to complete the current action and selects a new request based on a "round robin" scheme among the threads.

The current thread could also be stopped if the CSS 300 has initiated a DMA operation with sleep turned on. The stopped thread later comes back into context (woken up) after completion of the DMA operation. When a fresh request is initiated by the CMP, the IMA 414 includes the control/data token to be processed.

A watch dog timer expiration can also be used by the thread controller 412 to retire a thread and initiate a new thread activity. The watch dog count is a configurable value that can be automatically loaded whenever a thread comes into context. When the watch dog timer expires the program counter (PC) of the current thread is saved and the CSS 300 is scheduled to another thread. A fresh request can also be issued substantially simultaneously to the thread controller 412 by the watch dog module 412A, if the action has not been completed.

The processing threads which are suspended during a hardware operation can be restarted by a fresh request for CSS 300 processing. A fresh request for CSS 300 processing is scheduled after the hardware operation has been completed.

The data tokens arriving an the input of CME 254B as shown in FIG. 2D above are stored in a logical FIFO. The active segment of logical FIFO is also memory mapped to the processor as Input Message Area. An application running on the CSS 300 triggers an OMP 420 (e.g., an external entity to SE 228, 230, 232) to send the control/data message that has been setup in the output message area (OMA) 418, which is again a memory mapped view of the logical FIFO that is in context. CSS 300 allows the processor to continue to another data token while the output message has been queued up for consumption by the next stage. The application running on CSS-300 is expected to check for the FIFO status, so that data is not lost if the output FIFO is full.

Table 1 illustrates the memory allocation for an exemplary embodiment. By way of example, it may be noted that CSS 300 in this instance has a bottom 64 MB of memory address dedicated to instruction area and 64 MB (0x400_0000) onwards for data memory. 128 B (divided among 32 registers of 32 b each) is available for hardware interaction both in 1 clock access area as well as 3 clock access area. This allows the memory to respond to the timing of the hardware components and provide critical data resources in the 1 clock access domain.

TABLE 1

| Resource Type | Address | Description |
|---|---|---|
| Thread independent 1 Clock Access Resources: Total Space = 8 KB | | |
| Mem | 400_0000 | Memory used for house keeping functions (also called Master Thread or Thread-0) |
| Regs | 400_1F80 | Registers used for house keeping hardware (for example mail boxes, performance counters, Local Buffer Agent pointers) |
| Thread Specific 1 Clock Access Resources: 8 KB | | |
| 0 | 400_2000 | Memory for Message processing functions (non master threads). Memory of all threads overlay to same address here. |
| 1 | 400_3F80 | Registers used for interacting with message processing hardware |
| Thread Specific 3 clock Access Resources: 16 KB | | |
| 0 | 400_4000 | Memory for Message processing functions (non master threads). Memory of all threads overlay to same address here. |
| 1 | 400_7F80 | Registers used for interacting with message processing hardware |

The applications and hardware can interface with the CSS 300 a through common set of command register, control register (status register) and condition register. The command register provides the capability for the software application to trigger a hardware module. The control register provides the capability for the application to control a hardware module. The condition register provides the capability for a hardware module to notify an application. In addition, a context addressable memory (CAM) output is also included in the XCore registers 316. The CAM can be used to jump to a known location to process a specific external situation. Each of the above registers is mapped to 1 clock resource. In one embodiment, these registers are all included in the XCore registers 316, although it should be understood the registers could be in any memory location that is accessible in a predetermined number of clocks. In addition, there are 1 clock access memory resources which provide detailed supportive parameter to hardware or detailed response information from hardware.

Table 2 is an exemplary list of registers in one embodiment. The miscellaneous registers described above can be used for parameter/response data exchange.

TABLE 2

| Bit no | Name | Width | Rst. value | Description |
|---|---|---|---|---|
| 0 | SendDefMsg | 1 | 0 | This command bit indicates that data message is ready (in output message area) for sending out and it can be done so. The size of the message is default and hardware is expected to understand it. The message size is 8 words. Note that the same command is also used to send control message (there is no separate SendCtlMessage command anymore). As a corollary, the message can be sent from OMA only and not from IMA. When this command bit is set by itself, the message is routed to PDQ but if it is set along with SenMsg2PAE, the message is set to PAE, instead. |
| 1 | StartDMA | 1 | 0 | Triggers the DMA module. It also sets DMANotSent and DMABusy input condition bits. This is a general purpose DMA command and through it any kind of memory request can be made. |
| 2 | StartDMARead | 1 | 0 | Start DMA read. This is fast version of StartDMA command |
| 3 | StartDMA Write | 1 | 0 | Start DMA write. This is fast version of StartDMA command |
| 5:4 | Start Count | 2 | 0x0 | Each of these bits start one event counter |
| 6 | Update2OMA | 1 | 0 | This command triggers hardware and in 4 clocks, the IMA data is copied to OMA (64 bits in one clock). The copy hardware uses same port as used by CPU. Thus CPU should use IMA or OMA for 4 clocks after giving this command for writing purpose (most of the cases, CPU may never have to write IMA or OMA, at least when this command is applicable). |

TABLE 2-continued

| Bit no | Name | Width | Rst. value | Description |
|---|---|---|---|---|
| 7 | Sleep | 1 | 0 | Causes Thread controller to go to sleep |
| 9:8 | Clear & Start Count | 2 | 0x0 | Each of these bits clears and starts the respective counter |
| 10 | ReadHostMsg | 1 | 0 | This command causes the HostInputRdy bit to clear. |
| 11 | SendHostMsg | 1 | 0 | This command indicates that message in outbox is ready |
| 13:12 | Stop Count | 2 | 0x0 | Each of these bits stop the respective counter |
| 14 | ThreadDone | 1 | 0 | ThreadDone" which causes the thread to go to "Idle" state. This indirectly acts as "ReadNextPrs" also. |
| 15 | ThreadClosed | 1 | 0 | "ThreadClosed" which causes the thread to go to "Invalid" state |
| 17:16 | Clear Count | 2 | 0x0 | Clear the respective counter |
| 18 | GetGpBufPtr | 1 | 0 | Trigger the hardware to fetch a general purpose buffer pointer. The type of buffer pointer to be fetched is specified in the status register "GpBufPtrType" The request pointer is returned in the miscellaneous register (GpButPtr) |
| 19 | Reserved | 1 | 0 | To be defined |
| 20 | SendMsg2PAE | 1 | 0 | Asks the OMP module to send the message to PAE instead of PDQ. Read about SendDefMsg too. |
| 21 | Convert2Offset | 1 | 0 | This command is given to NFA machine. It causes the machine to start from TransIDNode as indicated by WalkerStack and TransIDIdNodeOffset (part of perflow) as start value and go till first FirstNodeFlag node or previously set pointer (as indicated by LastSentSemObjs). The "nextPtr" is used to traverse the chain. At each stage, the current offset for TransIDNode is found by adding 0x20 to previous offset (starting with TransIDIdNodeOffset). That offset replaces the value of "ThisNode" field of the transIdNode. Likewise we keep a CurrPredicateOffset register which starts with PredicateOffset value (from perflow register) and whenever first TransIDNode is read (either immediately after starting the process or after node with FirstNode flag), ElementSize value of that node is subtracted from CurrPredicateOffset. The ElementStore field of each node traversed is replaced with value of CurrPredicateOffset register. Note that the node pointed by LastSentSemObjs, itself is not converted (it is expected to be converted beforehand).<br>Once this step is over, we start again from TransIdBuff and traverse same nodes, but this time, at every node, if PrevNode is not NULL, we read the TransIDNode pointed by PrevNode field (parent one) and then get "ThisNode" value of parent node and replace PrevNode of current TransIDNode with "thisNode" value of parent node.<br>Following are two subcases:<br>1. When Convert2OffsetAll is false: In this case, the conversion works only till (and including) first FirstNode flag node (as opposed to going till LastSentSemObjs).<br>2. When ConvertPstrOffsetOnly is True: In this case, conversion is limited to first pass only (as described above). And in that case also, only ElementStore field is updated and not "ThisNode". |
| 22 | StartNFA | 1 | 0 | The NFA machine starts the structural matching process. |
| 23 | SartSearch | 1 | 0 | This command triggers the LKM module to do the search based on the input key and search parameters, from search registers. It may be noted that search registers are part of perflow data and they may come either from grammar descriptor (if new flow) or from previous search database. |
| 24 | StartPMM | 1 | 0 | Start the predicate modification module. Note that this command gets qualified with three status bits: PMMValueOnly, PMMHLUOnly, PMMHGUOnly. |
| 25 | Reserved | 1 | 0 | To be defined |
| 26 | UpdatePredLen | 1 | 0 | Go through the complete TransIDNode list from walker stack and replace the ElementStoreSize and ElementStore of each TransIDNode (till FirstNode). This is done after NFA has completed the processing and PMM has completed the length change. The value to be replaced comes from Misc registers (400_3FAC: ElementStore; 400_3FB0: ElementSize). |
| 27 | UpdatePredStore | 1 | 0 | When a new predicate list (like that of CDATA) needs be added to existing one (like attribute list which came with SOE), this command is given to NFA. For all TransIDNodes in the active list, the ElementSize is updated (added to existing one) and PredicateNum is incremented. |
| 28 | NFADeAllocate | 1 | 0 | De-allocate TransIDNodes on the walker stack (CPU asks for this, on EOE event). The Starting node address comes from WalkreStack register. At the end of the operation, NFA provides the PstringLen and PstringPtr in miscellaneous register: 400_3FAC (Pstring Ptr) and 400_3FB0 (Pstring Len). HeadNode Register (400_3FB4) contains the pointer to first QueryHit or HasQParent node or (in case no node was found with either of these flags) NexrPtr field of the last node de-allocated. It may be noted that last node de-allocated is "FirstNode" node.<br>At the end of the execution, the NFA machine updates the TransIDBuf to new head node (this is same head node which is returned by HW in HeadNodePtr Miscellaneous register). |
| 29 | Reserved | 1 | 0 | To be defined |
| 30 | StartKGU | 1 | 0 | This is CPU command to start the KGU (after it has initialized the Len and String area) |
| 31 | Reserved | 1 | 0 | To be defined |

Table 3 is an exemplary control (status) register, in accordance with an embodiment.

TABLE 3

| Bit no | Name | Width | Rst. value | Description |
|---|---|---|---|---|
| 0 | SelDebugThreadID | 1 | 0 | This bit represents "SelDebugThreadID" status. When set to '1', the fields DebugThreadID and DebugContextID can be used as alternative source of threadID/ContextID (which otherwise come from thread controller). This bit is set to '1' to read/write memory resources (for example during bootup sequence) of various threads/contexts. It may be noted that SW can see only one thread/one context at a time and without this control, the selection of thread/context is not in hand of SW. |
| 1 | WakeThread | 1 | 0 | This represents "WakeThread" status bit. Generally for usage, this bit is set and then reset in next instruction. |
| 3:2 | DebugThreadID | 3 | 0 | This represents DebugThreadID value (used along with SelDebugThreadID or WakeThread" status bits. |
| 7:4 | DebugContextID | 4 | 0 | This represent DebugContextID value (used along with SelDebugThreadID" status bit. |
| 9:8 | GpBufPtrType | 2 | 0 | Type of General Purpose buffer pointer required by CPU. |
| 10 | GpBufPtrVld | 1 | 0 | When set, indicates that the buffer pointer specified by the "GpBufPtrType" is available in the miscellaneous register "GpBufPtr". A read to the register "GpBufPtr" clears the bit if set. Read Only. |
| 11 | LBufPtr0Vld | 1 | 0 | When set, indicates that the buffer pointer of type 0 is available in miscellaneous register "LBufPtr0". A read to the register "LBufPtr0" clears the bit if set. Read Only. |
| 12 | LBufPtr1Vld | 1 | 0 | When set, indicates that the buffer pointer of type 1 is available in miscellaneous register "LBufPtr1". A read to the register "LBufPtr1" clears the bit if set. Read Only. |
| 13 | EnableLBA | 1 | 0 | Enable LBA operation. This bit is expected to be set after bootup. |
| 14 | WakeOnKeyRdy | 1 | 1 | If this bit is '1', and KeyRdy gets asserted high from low, create a wakeup signal (one clock) to thread controller for the related thread. |
| 15 | WakeOnKeyError | 1 | 1 | If this bit is '1', and KeyError gets asserted high from low, create a wakeup signal (one clock) to thread controller for the related thread. |
| 16 | WakeOnSearchRdy | 1 | 1 | If this bit is '1', and SearchRdy gets asserted high from low, create a wakeup signal (one clock) to thread controller for the related thread. |
| 17 | WakeOnIndexRdy | 1 | 1 | If this bit is '1', and IndexRdy gets asserted high from low, create a wakeup signal (one clock) to thread controller for the related thread. |
| 18 | WakeOnPMMDone | 1 | 1 | If this bit is '1', and PMMDone gets asserted high from low, create a wakeup signal (one clock) to thread controller for the related thread. (Was KGUEnable) |
| 19 | WakeOnPMReqired | 1 | 0 | Wake up when PMRequired condition set signal comes in. |
| 20 | Reserved | 1 | 0 | To be defined (as additional WakeOn condition) |
| 21 | CreateR0Node | 1 | 0 | When NFA is processing SOE, it creates R0Node if there is no rule hit. The creation is subject to this status bit. |
| 22 | PMMValueOnly | 1 | 0 | Indicates that PMMStart command is to convert only value (there is no name part). This is used in CDATA processing where there is no Indexing involved. |
| 23 | PMMHLUOnly | 1 | 0 | Indicates that PMMStart command is to use HLU only. This is to enable the SW use the hash lookup facility in non XML contexts or when predicate modification is not needed or it is to be done in different way than what HW supports. If this status bit is false (default case), the expected behavior is general predicate modification (name indexing and value conversion), which in turn is used to accelerate the predicate evaluation. |
| 24 | PMMHGUOnly | 1 | 0 | Indicates that PMMStart command is to use Hashing facility of HLU only. The output (hash value) is written in IndexValue miscellaneous register. This is to enable the SW use the hash generation facility in non XML contexts or when predicate modification is not needed or it is to be done in different way than what HW supports. This bit takes effect only when PMMHLUOnly is set to '0'. |
| 25 | Convert2OffsetAll | 1 | 0 | If this bit is '1', the Convert2Offset HW works all the way to the last node indicated by LastSentSemObjs else the conversion stops at first "FirstNode" flag. |
| 26 | ConvertPstrOffsetOnly | 1 | 0 | When this bit is set, the Convert2Offset converts Pstring ptr (ElementStore field) only and not PrevNode field. This bit should not be set (not checked by HW) when Convert2OffsetAll is true. |
| 31:27 | Reserved | 6 | 0 | To be defined |

Table 4 is an exemplary condition register details, in accordance with an embodiment. Note that bits 31:25 and bits 5:0 can be forcibly cleared by CPU by writing 0 to those positions.

TABLE 4

| Bit no | name | Width | Rst. value | Description |
|---|---|---|---|---|
| 0 | LastRule | 1 | 0 | Indicates that rule has already been found out for this flow (during previous token search) and no further search tree exist for that. CMP module will anyway ignore token once this bit has been set, but there may be case where already next token has been deposited to IMA area and for this CPU, at least has to give ThreadDone signal [the SW should check the corresponding perflow flag and discard message if it has to, since HW can not discard such a message itself] This bit is reset by ThreadDone. |
| 1 | PMMDone | 1 | 0 | The predicate modification unit has completed the job. The Unit could have either done predication modification or just got the job of hash generation and/or lookup (by HLU) or value (CDATA conversion) only. StartPMM or ThreadDone reset this flag. |
| 2 | KeyRdy | 1 | 0 | KGU is ready with key. StartKGU or ThreadDone are reset condition for this. |
| 3 | KeyError | 1 | 0 | There is an error in Key generation. StartKGU or ThreadDone are reset condition for this. |
| 4 | SearchRdy/ NFADone | 1 | 0 | Search is complete (null base, next base or index has been found). When NFA is active, this bit indicates that NFA has completed its activity. NFA would indicate completion of node processing (if the command was NFAStart) or completion of node de-allocation (if command was NFADeAllocate) or completion of predicate store update (if the command was UpdatePredStore) or completion any other NFA command, as the case may be. Convert2Offset, StartNFA, SartSearch, UpdatePredLen, UpdatePredStore, NFADeAllocate, ThreadDone clear this flag. |
| 5 | IndexRdy/ QueryHit | 1 | 0 | In case of XRL flow this indicates that Rule Index has been found. In case of NFA search, this indicates that query hit (at least one) has been found in the active list. There is only one pulse on QueryHit during full NFA activity session. This is set along with NFADone (same as SearchRdy). Convert2Offset, StartNFA, SartSearch, UpdatePredLen, UpdatePredStore, NFADeAllocate or ThreadDone clear this flag |
| 6 | Exception | 1 | 0 | This bit indicates that an exception condition (which is not masked off via "CSS Event Mask Register": offset 0x1F84) has occurred. The condition which caused this exception is available in the "CSS Event Source Register" (miscellaneous register at offset 0x1F80). This also triggers the generation of the asyncEvent condition. |
| 7 | DataToken | 1 | 0 | This bit indicates that a data token from PRS is ready to be processed. |
| 8 | CntlToken | 1 | 0 | This bit indicates that a control token from PRS is ready to be processed. |
| 9 | OMPBusy | 1 | 0 | OMP is sending or waiting to send data to PDQ or PRS. |
| 10 | HostInputReady | 1 | 0 | This bit is set when CPU Input mailbox register is written as indicated by Host CPU through Extended Debug Register (Aux reg. 8) and is cleared when the mail box registers have been is read by CPU as indicated by command bit ReadHostMsg. |
| 11 | NewThread | 1 | 0 | This bit defines that this thread is new (and previously the thread was invalid). |
| 12 | DMANotSent | 1 | 0 | The DMA request has not been sent to memory yet (and another request can not be taken in). Gets set next clock to command like DMABusy. It is reset as soon as request has been dispatched |
| 13 | DMABusy | 1 | 0 | DMA is busy with data xfr. Get set next clock to command register. |
| 14 | ClearThread | 1 | 0 | Clear the thread (new flow has to come in) |
| 15 | AsyncEvent | 1 | 0 | this signal is simply OR of following are the events: HostInputReady, Exception [See definition under Exception in this table] WakeThread (if DebugThreadID = 0) |
| 21:16 | TokenType | 6 | 0 | Indicates which of the control token has come |
| 23:22 | ThreadID | 3 | 0 | This is the value of current ThreadID. |
| 24 | HostOutputRdy | 1 | 0 | A Message to host is ready. The bit gets set when SendHostMsg command is executed and it gets cleared when host executes "MsgRead" command. |
| 25 | Reserved | 1 | 0 | To be defined: NEED be message specific condition only. |
| 26 | ReProcess | 1 | 0 | This bit indicates that the message is from RPE (reverse Parser thread). This is same as bit #30 of header word (for data messages). There is no clear for this. It is valid when DataToken bit is valid. |

TABLE 4-continued

| Bit no | name | Width | Rst. value | Description |
|---|---|---|---|---|
| 27 | HLUError | 1 | 0 | Following conditions may have come:<br>1. Valid bit (of address entry) for word 0 is zero<br>2. If collision is set and current MatchEntryNum is 0<br>3. String does not match, with any entry<br>4. HLU was unable to find the index for the string<br>Cleared under StartPMM or ThreadDone. |
| 28 | LKMNullBase | 1 | 0 | LKM did not hit any address entry or data entry<br>StartSearch or ThreadDone clear it. |
| 29 | AllDeAllocated | 1 | 0 | NFA indicates that all nodes were de-allocated (during command given to it as part of, say, EOE processing).<br>Cleared on NFADeAllocate or ThreadDone. |
| 30 | PMRequired | 1 | 0 | The NFA hardware has detected that predicate modification is required. This is based on: ProcessPredicate of TargetNode (first occurrence sets it). PMRequired will not be generated if only R3 node is created in target list irrespective of "ProcessPredicate".<br>Cleared on StartNFA or ThreadDone |
| 31 | Reserved | | | To be defined |

Figure 5:
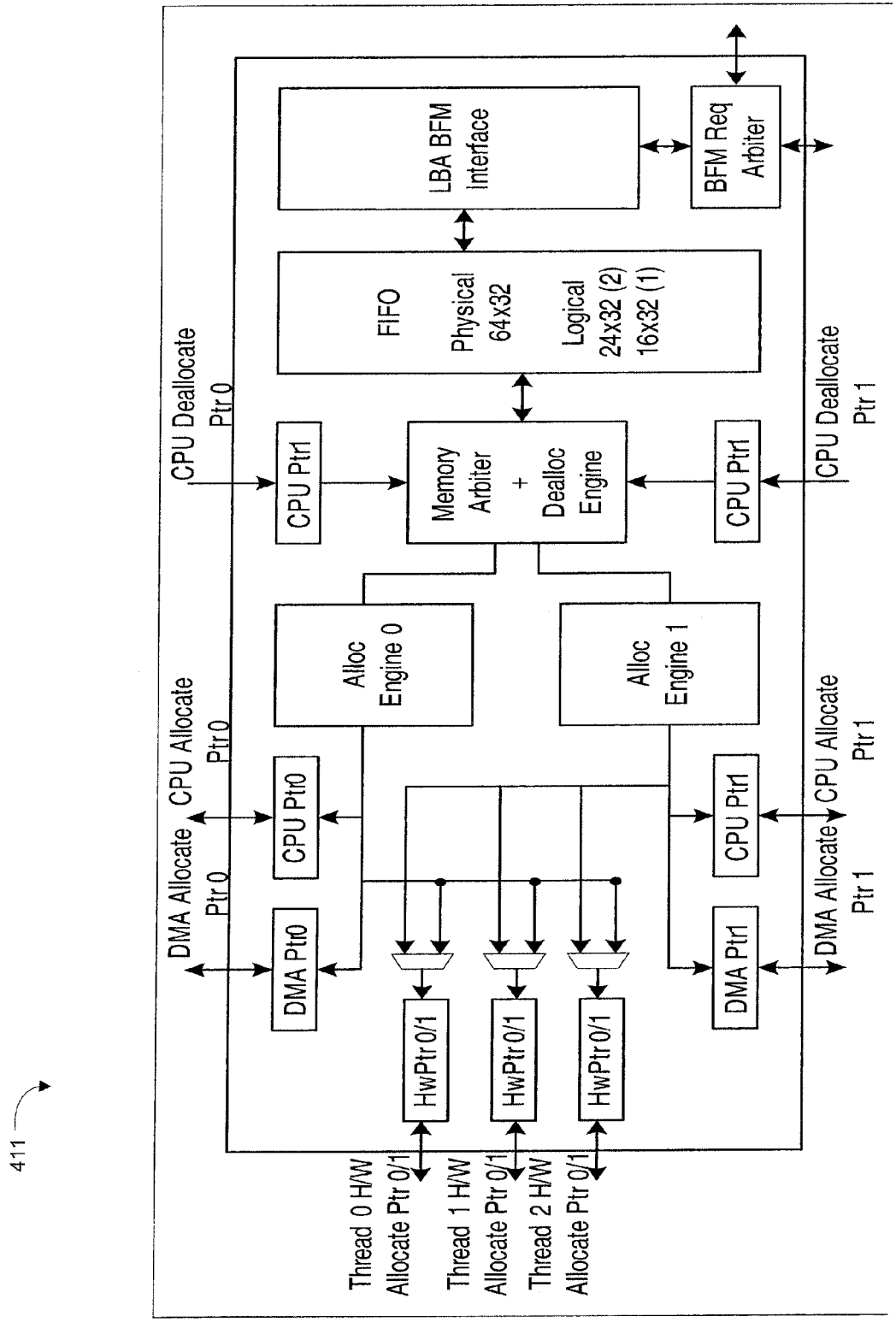
FIG. 5 is a detailed block diagram of the local buffer agent, in accordance with an embodiment of the present invention.

FIG. 5 is a detailed block diagram of the local buffer agent 411, in accordance with an embodiment of the present invention. The local buffer agent 411 maintains a list of free buffer pointers for consumption by the DMA engine as well as the CSS 300. The local buffer agent 411 can be configured to maintain more than one (e.g., 2, 3, 4, 8, etc.) types buffers in the pool of available pointers. The local buffer agent 411 makes buffer allocation requests to the buffer manager 330 for the respective buffer types (as configured). The buffer pool can include a selected maximum number of buffer pointers of a particular buffer type. By way of example, the buffer pool can include a maximum of 24 buffer pointers of a particular buffer type. It should be understood that the buffer pool can include a maximum of more (e.g., 32, 48, 64, etc.) or less (e.g., 2, 4, 8, 12, etc.) than 24 buffer pointers of a particular buffer type.

The buffers pointers of each type can be maintained in a logical first in first out (FIFO) manner using a single physical memory. The single physical memory can be dual port memory. Fetching a pointer to the pool and de-allocation of a pointer released by the CSS 300 from or to the buffer manager 330 can be performed using one physical memory port. The allocation of pre-fetched pointers to the requesting entities and collection of de-allocated pointers can be performed using the second memory port.

If the number of buffer pointers in the pool is less than a selected threshold (e.g., 8, 16, etc.) a request can be issued to the buffer manager 330 to refill the pool. If the buffer manager 330 returns a NULL pointer, local buffer agent 411 can reissue a read for the free buffer pointer.

The local buffer agent 411 also maintains a collection FIFO for de-allocation. The collection FIFO can be part of the same physical memory. The collection FIFO can be logically 16 deep. It should be understood that the collection FIFO can be logically more (e.g., 24, 32, 48, etc.) or less (e.g., 4, 8, 12, etc.) than 16 deep. If the number of buffer pointers to be de-allocated is more than a selected amount (e.g., 8), a de-allocation request is issued to the BFM 330 to return 8 buffer pointers. Prefetch of new pointers or deallocation of collected free pointers can be mutually exclusive. Prefetch of new pointers or deallocation of collected free pointers occurs one at a time as the events share the same memory port. Pointer prefetch can have a higher priority than a deallocation of collected free pointers.

The local buffer agent 411 also provides pointer from one of the banks of memory (e.g., can be configured during boot up) for up to 3 external entities. The external entities can be used by the interfacing hardware for pointer allocation.

The CSS 300 reads the buffer pointer from the pool using miscellaneous register 312. The availability of free pointers in the pool is indicated to the CSS 300 as condition flags. The condition flags can be an extension of the valid signal to the CSS 300 status register. An application running on the CSS 300 will check if the pointer is valid before attempting to read the free buffer pointer from the miscellaneous register 312.

There are two register addresses available to the CSS 300 to the different buffer types. A write to these addresses will result in deallocation of the pointer. When writes to these registers are issued, the values are returned to the buffer manager 330 as pointers. In at least one embodiment, there is no restriction of writing to a specific register to deallocate a specific pointer. A write to any of the registers with the value of a buffer pointer to be freed will result in the pointer being returned to the buffer manager's 330 free pointer list. The DMA engine and the external hardware also use the pointers using the above described protocol.

The function of the SRE 440 is to save/restore the application data on receiving the uncache/cache message from the CMP 302. The save or restore operation is initiated based on the control values set by the application software in perFlow area in the form of descriptors. A descriptor is used to define one contiguous area of CSS 300 local memory. Up to 3 descriptors are supported by the SRE 440. The SRE 440 uses the DMA 430 engine (master thread) to save/restore the data to/from the external memory.

Table 6 is a SRE descriptor in CSS 300 PerFlow area format, in accordance with an embodiment of the present invention.

TABLE 6

SREPerStream (24 bytes)

| Word | 31 30 | 29 28 | 27 26 25 24 23 | 22 21 | 20 19 | 18 17 16 15 14 | 13 12 11 10 9 8 7 6 5 4 3 2 1 0 |
|---|---|---|---|---|---|---|---|
| 26 | BufTyp | Rsvd | | SegLen0 | | DCnt | LocalMemAddr0 |
| 27 | | | | | | RemoteMemAddr0 | |
| 28 | BufTyp | Rsvd | | SegLen1 | | RsVd | LocalMemAddr1 |
| 29 | | | | | | RemoteMemAddr1 | |
| 30 | BufTyp | Rsvd | | SegLen2 | | Rsvd | LocalMemAddr2 |
| 31 | | | | | | RemoteMemAddr2 | |

Table 7 is a field description of the SRE 440, in accordance with an embodiment of the present invention.

TABLE 7

| Field | Offset | Bit(s) | Description |
|---|---|---|---|
| BufTyp0 | 0x0000 | 31:30 | Buffer type used to store the application data. This field is inserted by the SRE. |
| Reserved | 0x0000 | 29:28 | Not Used |
| SegLen0 | 0x0000 | 27:16 | Size of the application data segment in bytes. Valid only if the DCnt is non zero. |
| DCnt | 0x0000 | 15:14 | Count of number of descriptor to be handled by SRE for an cache/uncache operation<br>00—No action to be formed by the SRE. SRE indicates a cache/uncache done, if the count is 0.<br>01—Indicates that one application description is to be processed<br>10—Indicates that two application description are to be processed<br>11—Indicates that three application description are to be processed |
| LocalMemAddr0 | 0x0000 | 13:00 | Local Memory address at which the application data needs to save from or restored to. This field is provided by the CPU. Valid only if the DCnt is non zero. |
| RemoteMemAddr0 | 0x0000 | 31:00 | Pointer in Remote Memory where the first buffer that holds the application data needs to be read/written from/to in case of a cache/uncache. This field is provided by the SRE.. Valid only if the DCnt is non zero. |
| BufTyp1 | 0x0000 | 31:30 | Buffer type used to store the application data. This field is inserted by the SRE. |
| Reserved | 0x0000 | 29:28 | Not Used |
| SegLen1 | 0x0000 | 27:16 | Size of the application data segment in bytes. Valid only if the DCnt is 2. |
| Reserved | 0x0000 | 15:14 | Not used |
| LocalMemAddr1 | 0x0000 | 13:00 | Local Memory address at which the application data needs to save from or restored to. This field is provided by the CPU. Valid only if the DCnt is 2. |
| RemoteMemAddr1 | 0x0000 | 31:00 | Pointer in Remote Memory where the first buffer that holds the application data needs to be read/written from/to in case of a cache/uncache. This field is provided by the SRE.. Valid only if the DCnt is 2. |
| BufTyp2 | 0x0000 | 31:30 | Buffer type used to store the application data. This field is inserted by the SRE. |
| Reserved | 0x0000 | 29:28 | Not Used |
| SegLen2 | 0x0000 | 27:16 | Size of the application data segment in bytes. Valid only if the DCnt is 3. |
| Reserved | 0x0000 | 15:14 | Not used |
| LocalMemAddr2 | 0x0000 | 13:00 | Local Memory address at which the application data needs to save from or restored to. This field is provided by the CPU. Valid only if the DCnt is 3. |
| RemoteMemAddr2 | 0x0000 | 31:00 | Pointer in Remote Memory where the first buffer that holds the application data needs to be read/written from/to in case of a cache/uncache. This field is provided by the SRE.. Valid only if the DCnt is 3. |

Figure 6:
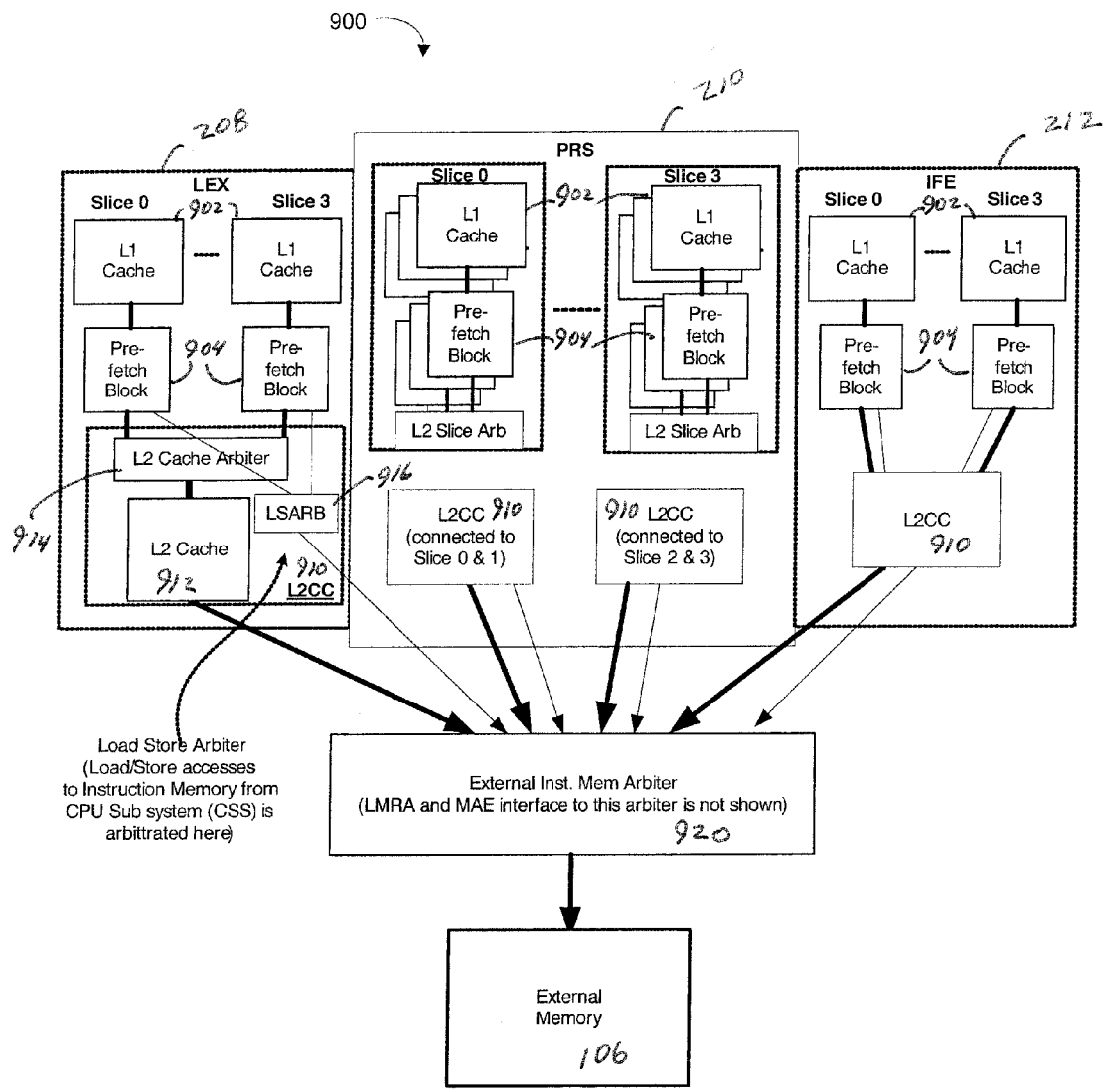
FIG. 6 shows a logic block diagram of an overall level 2 cache, in accordance with an embodiment of the present invention.

FIG. 6 shows a logic block diagram of an overall level 2 cache 900, in accordance with an embodiment of the present invention. For a parser module 210 that is expected to execute a significant amount of code, the cache memory can be duplicated to reduce contention. The level 2 cache 900 includes each ARC SE 228, 230, 232 includes a L1 cache 902 along with a prefetch block 904. The prefetch block 904 includes one or more prefetch buffers 906.

There is a common L2 cache for all the ARC processors of a single module (e.g., lexer 208, parser 210, IFE 212). The misses from L2 cache 910 are serviced by the external memory 106. The lines prefetched by the prefetch block 904 are also loaded into the L2 cache 910. The load/store accesses to instruction memory are arbitrated in the load/store instruction memory arbiter (LSARB) 916. The load/store accesses to instruction memory originate from the CSS 300. The load/store accesses can be output to the data RAM 912 of the L2 cache 910 or the external instruction memory.

Figure 7:
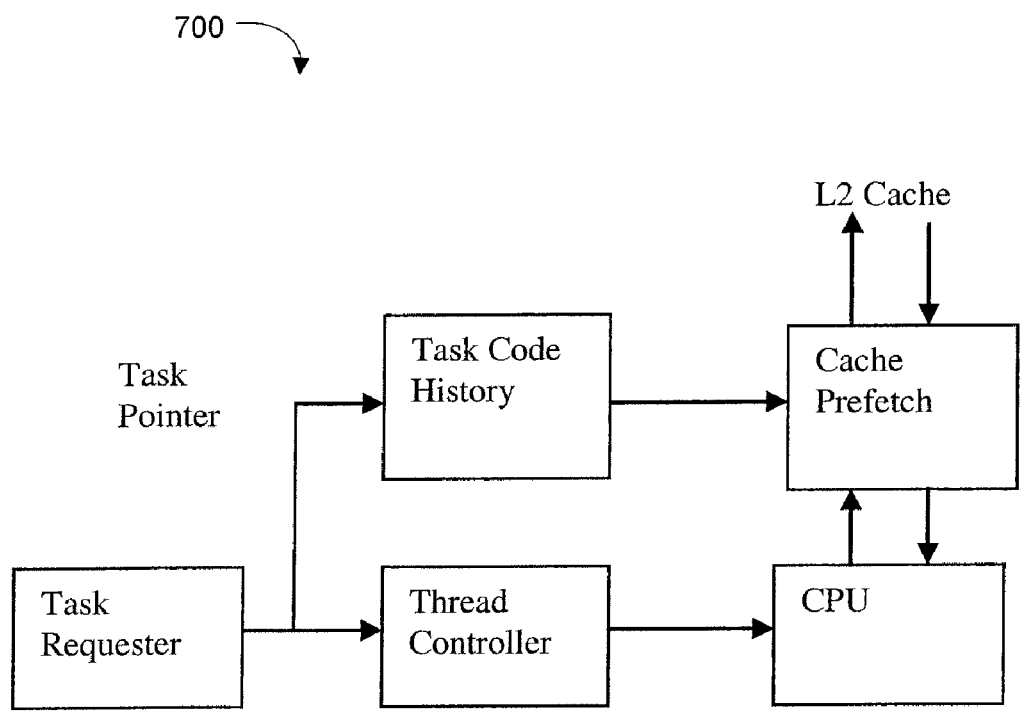
FIG. 7 is a block diagram for managing a deterministic prefetch scheme, in accordance with an embodiment of the present invention.

FIG. 7 is a block diagram 700 for managing a deterministic prefetch scheme, in accordance with an embodiment of the present invention. The instructions to be prefetched at first level decided by task pointer coming to thread controller that will go to CSS 300. At a second level, the instructions to be prefetched are identified by the task code history. The task code history is a cache by itself along with some additional logic. The logic detects a number of code segments to be prefetched and size of each segment for a given task pointer.

The prefetch block 904 uses the unused bandwidth of the L2 cache 910 and external instruction memory to prefetch cache lines and make it available for L1 cache 902. The prefetch block 904 uses an unused bandwidth by giving preference to fetch due to L1 cache miss over fetch due to prefetch requirement.

Before a thread starts executing on the SE 228, 230, 232, the prefetch block 904 pre-fetches the first cache line by getting the instruction pointer from the thread controller 412. This ensures that the first cache line of the action will hit in the prefetch buffer 906. While the SE 228, 230, 232 is executing the first cache line, the next cache line buffer will be fetched by the prefetch block 904.

If there is a L1 cache miss, the prefetch block 904 fetches the missed cache line and the next cache line. If the prefetch block 904 is disabled, then the request from L1 cache 902 is forwarded to L2 cache arbiter 914 and next line prefetch does not occur.

When a L1 cache miss occurs, the prefetch block checks if the required line is present in any of the prefetch buffers 906. If present, then the line is fed from the prefetch buffer 906 to the L1 cache 902, and the next cache line is fetched from L2 cache 916 and loaded in the next line prefetch buffer.

If absent, then the missed line and the next cache line is fetched from L2 cache 910. The missed line is passed on to the L1 cache 902, and the next cache line is loaded in the next cache line buffer. The prefetch line buffers 1006 carry the cache line data, tag, and a present bit. The present bit indicates whether a cache line corresponding to the tag is present in the buffer or not.

The prefetch state machine manages and sets the priority of the request. If an L1 cache miss request occurs the miss request is compared to all the prefetch buffers 906. If a match in a prefetch buffer 906 is found, the data is fed from the respective prefetch buffer. If a match is not found in the prefetch buffer 906, the request is forwarded to L2 cache 910. When the data is returned, the data is forwarded to L1 cache 902. The prefetch block 904 generates subsequent request for the next cache line and sends the subsequent request to the L2 cache 910. When the data for the next cache line request returns from L2 cache 910, the data is loaded into the next line prefetch buffer.

The prefetch block 902 gives priority to the missed cache line fetch and next cache line fetch over the first line fetch. With the request sent to the L2 cache 910, a priority signal is also sent to the L2 cache arbiter 914. The priority is as follows: When a request is sent, the priority is HIGH if it is L1-cache miss request and LOW if it is next-line prefetch request. Since the L2 cache arbiter 914 services multiple requestors (e.g., prefetch blocks 904 of other SE 228, 230, 232), the request may not be serviced immediately.

The priority of the request that is waiting to be serviced will change on the following basis: If currently the priority is LOW, then priority will change to HIGH if there is L1-cache miss request. This forces the L2 cache arbiter 914 to consider the currently pending request with highest priority to reduce the delay of a higher priority request (e.g., a L1 cache miss) waiting behind the currently pending request.

In addition, the prefetch block 904 can bypass the prefetch block 904 if the prefetch block is disabled. If the prefetch block 904 is disabled, the requests from L1 cache are forwarded to L2 cache arbiter 914. Instruction base (QIB) can be added to all instruction addresses from L1 cache 902. The prefetch block 904 state machine 1010 processes miss requests from L1 cache and gives requests for the next line.

Host/CSS 300 can read the prefetch buffer 906 contents. Access is allowed only when the prefetch block 904 is in debug mode and the SE 228, 230, 232 is halted so that new requests cannot arrive in the prefetch buffer 906.

The L2 cache arbiter and instruction fetch interface converter 916 has three functions: identify the highest priority request that will be serviced by L2 cache 910 from the 12 request inputs if there are 12 SE 228, 230, 232 requesting. The L2 cache arbiter and instruction fetch interface converter 916 also provides the request to L2 cache 912. The request will be presented to the L2 cache in the same way as the SE 228, 230, 232 presents a request to L1 cache 902. This system allows a single L2 cache 910 to have shared access by multiple SEs 228, 230, 232. By way of example the SE 228 in a lexer 208 can access the L2 cache 910 in a SE 230 in a parser 210. This allows for shared processing power when one portion of a data flow needs additional processing power.

The priority of the request going to the external memory arbiter is set. This block is made up of two blocks and instantiated in the same level. A priority-based common arbiter is instantiated as s secondary arbiter. The arbiter interface to instruction fetch interface converter.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code and/or logic on a computer readable medium. The computer readable medium is any data storage device that can store data which can thereafter be read by a computer system. Examples of the computer readable medium include hard drives, network attached storage (NAS), logic circuits, read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system comprising:
a central processing unit (CPU) including logic for executing code from a storage location and at a time determined by an external entity;
a data cache; and
a CPU management entity (CME) including logic for receiving data one unit at a time from an external data feeder, the data unit being arbitrarily defined mutually between the data feeder and the CME, and the CME being coupled to the CPU, the CME including logic to provide the received data unit, a corresponding context information and a corresponding code address to the CPU, wherein the CPU includes logic for notifying the CME of a completed execution wherein the CME includes a plurality of command, control and condition registers, wherein each bit of a plurality of bits in the command register defines a trigger for a corresponding hardware or software function and wherein each bit of a plurality of bits in the command register is self clearing.

2. The system in claim 1, wherein the CPU is an embedded CPU.

3. The system in claim 2, wherein the CME is hardware logic.

4. The system in claim 1, wherein the CME includes a local buffer agent coupled to an external memory system, wherein the local buffer agent includes logic for allocating and de-allocating memory buffer pointers.

5. The system of claim 4, wherein the CME includes an enhanced memory access (EMA) coupled to the external memory system and wherein the system includes logic for saving and storing data structures as objects.

6. The system in claim 1, wherein the CME further includes a plurality of command, control and condition registers.

7. The system of claim 6, wherein each bit of a plurality of bits in the command register defines a trigger for a corresponding hardware or software function.

8. The system of claim 7, wherein each bit of a plurality of bits in the command register is self clearing.

9. The system of claim 6, wherein one or more bits of a plurality of bits in the control register define a mode of a software or a hardware function.

10. The system of claim 9, wherein at least one of the one or more bits of the plurality of bits in the control register are not self clearing.

11. The system of claim 6, wherein one or more bits of a plurality of bits in the condition register define a completion or an error status of a software or a hardware function.

12. The system of claim 6, wherein at least one of the plurality of command, control and condition registers, includes a flag to indicate to a thread controller to schedule another thread.

13. The system of claim 1, wherein the CPU includes a level 1 instruction cache and wherein the CME includes logic for determining if a starting instruction is available in the level 1 instruction cache before the CPU executes code associated with the received data.

14. The system of claim 13, wherein if the starting instruction is not available in the level 1 instruction cache, then including logic for pre-fetching the starting instruction from an external instruction memory into the level 1 instruction cache.

15. The system of claim 14, wherein, the size of the pre-fetch is configurable.

16. The system of claim 1, wherein the CPU includes a level 1 instruction cache and a level 2 instruction cache, the level 1 instruction cache being logically closer to the CPU and wherein the CME includes logic for determining if a starting instruction is available in the level 1 instruction cache and wherein if the starting instruction is not available in the level 1 instruction cache, then including logic for determining if the starting instruction is available in the level 2 instruction cache and if the starting instruction is available in the level 2 instruction cache then including logic for pre-fetching the starting instruction from the level 2 instruction cache into the level 1 instruction cache and if the starting instruction is not available in the level 2 instruction cache then including logic for pre-fetching the starting instruction from an external instruction memory into the level 1 instruction cache.

17. The system of claim 1, wherein the CME is coupled to a memory system for storing and retrieving context information.

18. A method of executing code in an embedded CPU comprising:
accessing executable code from a storage location and at a time determined by a central processing unit (CPU) management entity (CME), wherein the CME is external from the CPU and wherein the CPU includes a data cache;
determining a data unit size in the data feeder and in the CME, the CME being coupled to the CPU;
receiving data from the storage location, the data being received one unit at a time, wherein receiving the data unit includes providing a corresponding context information and a corresponding code address to the CPU;
executing the received data unit in the CPU; and
notifying the CME that the received data unit execution is completed wherein the CME includes a plurality of command, control and condition registers, wherein each bit of a plurality of bits in the command register defines a trigger for a corresponding hardware or software function and wherein each bit of a plurality of bits in the command register is self clearing.

19. The method of claim 18, wherein the CPU is an embedded CPU.

20. The method of claim 19, wherein the CME is hardware logic.

21. The method of claim 18, wherein the CME includes a local buffer agent coupled to an external memory system, wherein the method further includes allocating and de-allocating memory buffer pointers in the local buffer agent.

22. The method of claim 21, wherein the CME includes an enhanced memory access (EMA) coupled to the external memory system and wherein the method further includes saving and storing data structures as objects.

23. The method of claim 18, wherein one or more bits of a plurality of bits in the control register define a mode of a software or a hardware function.

24. The method of claim 23, wherein at least one of the one or more bits of the plurality of bits in the control register are not self clearing.

25. The method of claim 18, wherein one or more bits of a plurality of bits in the condition register define a completion or an error status of a software or a hardware function.

26. The method of claim 18, wherein at least one of the plurality of command, control and condition registers includes a flag to indicate to a thread controller to schedule another thread.

27. The method of claim 18, wherein the CPU includes a level 1 instruction cache and wherein the method further includes determining if a starting instruction is available in the level 1 instruction cache before the CPU executes code associated with the received data.

28. The method of claim 18, wherein the CPU includes a level 1 instruction cache and a level 2 instruction cache, the level 1 instruction cache being logically closer to the CPU and wherein the method further includes determining if a starting instruction is available in the level 1 instruction cache and wherein if the starting instruction is not available in the level 1 instruction cache, then determining if the starting instruction is available in the level 2 instruction cache and if the starting instruction is available in the level 2 instruction cache then pre-fetching the starting instruction from the level 2 instruction cache into the level 1 instruction cache and if the starting instruction is not available in the level 2 instruction cache then pre-fetching the starting instruction from an external instruction memory into the level 1 instruction cache.

* * * * *